(12) United States Patent
Tamagawa et al.

(10) Patent No.: US 7,479,312 B2
(45) Date of Patent: Jan. 20, 2009

(54) RETARDATION FILM, POLARIZING PLATE, AND LIQUID CRYSTAL DISPLAY DEVICE

(75) Inventors: Minori Tamagawa, Hino (JP); Isamu Michihata, Machida (JP); Noriyasu Kuzuhara, Kunitachi (JP)

(73) Assignee: Konica Minolta Opto, Inc., Tokyo (JP)

( * ) Notice: Subject to any disclaimer, the term of this patent is extended or adjusted under 35 U.S.C. 154(b) by 203 days.

(21) Appl. No.: 11/477,180

(22) Filed: Jun. 28, 2006

(65) Prior Publication Data
US 2007/0009676 A1    Jan. 11, 2007

(30) Foreign Application Priority Data
Jul. 7, 2005    (JP)    ............................. 2005-198521

(51) Int. Cl.
*G02F 1/13363*    (2006.01)

(52) U.S. Cl. ..................... 428/1.33; 428/1.54; 349/117; 349/118; 349/96

(58) Field of Classification Search ................. 428/1.3, 428/1.31, 439, 1.33, 1.54; 106/139.1, 162.7, 106/168.01, 171.1; 264/1.34, 208; 349/117–118, 349/96
See application file for complete search history.

(56) References Cited

U.S. PATENT DOCUMENTS 2,689,799 A * 9/1954 Albus et al. ............ 106/169.39

2003/0037703 A1 * 2/2003 Saito ..................... 106/169.33
2003/0156235 A1 * 8/2003 Kuzuhara et al. ............. 349/96
2003/0170482 A1 * 9/2003 Murakami .................. 428/615
2005/0046074 A1 * 3/2005 Tasaka et al. ............... 264/207
2005/0112299 A1 * 5/2005 Shimizu et al. ............ 428/1.31
2005/0234231 A1 * 10/2005 Hashimoto et al. ............ 536/58

FOREIGN PATENT DOCUMENTS

JP    2003268127 A    *    9/2003

OTHER PUBLICATIONS

JPO Website Machine English Translation of JP 2003-68127 A, Isozaki et al., Sep. 2003.*

* cited by examiner

*Primary Examiner*—Keith D Hendricks
*Assistant Examiner*—Sophie Hon
(74) *Attorney, Agent, or Firm*—Frishauf, Holtz, Goodman & Chick, P.C.

(57) ABSTRACT

A retardation film which contains a cellulose derivative and a plasticizer wherein the thickness of the film is 10 to 50 μm, Ro in Equation (i) is in the range of 30 to 100 nm, Rt in Equation (ii) is in the range of 100 to 300 nm, and S in Equation (iii) is 0.0002 or more but not exceeding 0.030.

$Ro = (nx - ny) \times d$    Equation (i)

$Rt = S \times d$    Equation (ii)

$S = ((nx + ny)/2 - nz)$    Equation (iii)

(where "nx" is a maximum refraction index of the film surface, "ny" is a refraction index in the direction perpendicular to "nx," "nz" is a refraction index along the thickness of the film, and "d" is the thickness of the film.)

6 Claims, No Drawings

RETARDATION FILM, POLARIZING PLATE, AND LIQUID CRYSTAL DISPLAY DEVICE

This application is based on Japanese Patent Application No. 2005-198521 filed on Jul. 7, 2005, in Japanese Patent Office, the entire content of which is hereby incorporated by reference.

BACKGROUND OF THE INVENTION

This invention relates to a retardation film, a polarizing plate, and a liquid crystal display device.

A liquid crystal display device uses a retardation film to expand its viewing angle. The retardation film is provided between a polarizer and a liquid crystal cell. Namely, the retardation film is placed between a liquid crystal cell and a polarizing plate obtained by laminating the both surfaces of a polarizer produced by stretching an iodine-doped PVA (polyvinyl alcohol) with protective films made of TAC (triacetyl cellulose). There are various ways of placing the retardation film between a polarizer and a liquid crystal cell according to retardation values and characteristics. For example, the polarizing plate can have only one film on one side or two films on both sides. Further, some films of different kinds in lamination can be placed on one side. In some cases, layers of different optical anisotropic properties can be formed on a single film.

These retardation films respectively have a specific phase difference value (retardation value). The retardation value increases as the film becomes thinner because the film has less gelated portions in film formation. If the retardation value changes, the viewing angle and color of the film vary when viewed particularly obliquely. Various materials are used for the retardation films to enable various film structures. These materials may change reversibly when the environment (particularly humidity environment) changes. When a retardation film has a layer (optical anisotropic layer) which causes another phase difference on the supporting film on which a liquid crystal layer is coated, a TAC film, for example, is used as the support. However, the TAC film itself has a retardation value (particularly along the thickness of the film) and the retardation value changes depending upon moisture absorption and removal. The moisture absorption and removal are affected by the quantity of hydroxy groups in cellulose ester. In other words, the moisture absorption and removal become more vigorous as the total replacement ratio of hydroxy groups goes lower.

Recently, the inventors have produced a film which has both a retardation film function and a function to protect a polarizer by stretching a cellulose derivative film instead of a conventional TAC film to produce a phase difference. (For example, see Japanese Non-Examined Patent Publication 2003-270442.) However, the retardation value of this film changes reversibly when the humidity changes although the degree of the change is lower than that of the conventional TAC film.

Considering the above, it is not avoidable that the total retardation value between the polarizer and the liquid crystal cell changes reversibly when the humidity changes because of the existence of a layer whose retardation value is dependent upon the environment (humidity), including a TAC film which is used as a film to protect the polarizer.

In other words, a problem is that the display quality (viewing angle) of a liquid crystal display device is affected by a retardation change. To solve this problem, the use of a NOR-BORNENE film was taken into consideration but the NOR-BORNENE film using water-based adhesives is low in productivity because it is not dried up quickly.

Further, this problem with retardation changes sometimes occurred also when such retardation films and liquid crystal display devices were kept in hot and humid environments during transportation.

Further, since the display quality (viewing angle) of a liquid crystal display device is determined by a retardation value, even if a change of a retardation is small, if the retardation value is not appropriate, there may be a case that a fluctuation of the display quality (viewing angle) of a liquid crystal display device becomes large.

SUMMARY OF THE INVENTION

An object of this invention is to provide retardation films, polarizing plates, and liquid crystal display devices whose display qualities (viewing angle) are more stable by suppressing fluctuations of retardation values which are the faults in the conventional cellulose retardation films.

The above object of this invention can be accomplished by the following structures:

(Structure 1)

A retardation film which contains a cellulose derivative and a plasticizer wherein the thickness of the film is 10 to 50 μm, Ro in Equation (i) is in the range of 30 to 100 nm, Rt in Equation (ii) is in the range of 100 to 300 nm, and S in Equation (iii) is 0.002 or more but not exceeding 0.030.

$$Ro=(nx-ny)\times d \qquad \text{Equation (i)}$$

$$Rt=S\times d \qquad \text{Equation (ii)}$$

$$S=((nx+ny)/2-nz) \qquad \text{Equation (iii)}$$

(where "nx" is a maximum refraction index of the film surface, "any" is a refraction index in the direction perpendicular to "nx," "nz" is a refraction index along the thickness of the film, and "d" is the thickness of the film.)

(Structure 2)

The retardation film of Structure 1, wherein the retardation film contains a cellulose derivative and a plasticizer wherein the thickness of the film is 10 to 50 μm, Ro in Equation (i) is in the range of 30 to 65 nm, Rt in Equation (ii) is in the range of 100 to 150 nm, and S in Equation (iii) is 0.002 or more but not exceeding 0.015.

(Structure 3)

The retardation film of Structure 1 or 2, wherein the total acyl group replacement ratio (total acyl substitution degree) of the cellulose derivative is 2.0 to 2.6.

(Structure 4)

The retardation film of Structure 1, 2 or 3, wherein the retardation film contains a plasticizer of polyvalent alcohol ester (polyvalent alcohol ester plasticizer) and a plasticizer of aromatic end ester (an aromatic terminal ester type plasticizer).

(Structure 5)

The retardation film of any of Structures 1 to 4, wherein the radius of a free volume obtained by the Positron Annihilation Lifetime measurement is 0.250 to 0.310 nm.

(Structure 6)

A polarizing plate having the retardation film of any of Structures 1 to 5 on at least one of the surfaces.

(Structure 7)

A polarizing plate comprising a retardation film of any of Structures 1 to 5 and a polarizer having a thickness of 5 to 20 μm and made of ethylene denatured polyvinyl alcohol which having the content of ethylene unit of 1 to 4 mol %, the degree of polymerization of 2000 to 4000, and the degree of saponification of 99.0 to 99.99 mol %.

(Structure 8)

A liquid crystal display device equipped with a polarizing plate of Structure 6 or 7.

This invention can provide retardation films, polarizing plates, and liquid crystal display devices whose display qualities are stable by suppressing fluctuations of retardation values which are the faults in the conventional cellulose retardation films.

DETAILED DESCRIPTION OF THE PREFERRED EMBODIMENT

Below will be explained preferred embodiments to carry out this invention. However, it is to be understood that this invention is not intended to be limited to the specific embodiments.

After studying hard to solve the above problems, the inventors found that retardation films, polarizing plates and liquid crystal display devices whose display qualities are extremely stable without reversible and irreversible fluctuations in retardation values can be obtained by a retardation film (called a cellulose ester film in this invention) which contains a cellulose derivative and a plasticizer wherein the thickness of the film is 10 to 50 µm, Ro in Equation (i) is in the range of 30 to 100 nm, Rt in Equation (ii) is in the range of 100 to 300 nm, and S in Equation (iii) is 0.002 or more but not exceeding 0.030, which led to the invention. If S is less than 0.002, the retardation value fluctuation becomes greater. If S exceeds 0.030, the deterioration of the display device may be prompted by moistures.

$$Ro=(nx-ny)\times d \quad \text{Equation (i)}$$

$$Rt=S\times d \quad \text{Equation (ii)}$$

$$S=((nx+ny)/2-nz) \quad \text{Equation (iii)}$$

(where "nx" is a maximum refraction index of the film surface, "ny" is a refraction index in the direction perpendicular to "nx," "nz" is a refraction index along the thickness of the film, and "d" is the thickness of the film (nm).)

Average refraction indexes of samples for Ro, Rt, and S were measured by an Abbe refractometer. Further, three-dimensional refraction indexes of the samples were measured by Auto Double Refractometer KOBRA-21ADH (manufactured by Oji Scientific Instruments) at a wavelength of 590 nm in an environment of 23° C. and 55% RH. Ro, Rt, and S were calculated from the measured retardation values and average refraction indexes.

A reversible fluctuation in this invention means the fluctuation between results of first and last measurements is within a specified range of the instrument under an identical humidity-changing condition. As a definition, the reversible fluctuation in retardation values is observed after the film is kept for 5 hours in a humidity-controlled environment until the test environment is balanced to the relevant environment.

For confirmation of the effect on improvement of reversible fluctuations by this invention, it is preferable to change test humidity at a constant test temperature and measure film retardation and viewing angles. Further, it is possible to check whether the fluctuation is reversible by measuring film fluctuations in a normal environment (e.g. 23° C. and 55% RH) for comparison before and after measurement in a test environment in which humidity is changed for comparison.

An irreversible fluctuation in this invention means that the fluctuation in measurements before and after testing in a thermostatic chamber of 80° C. and 90% RH is within the specified range of the instrument. As a definition, the irreversible fluctuation in retardation values is observed after the film is kept for 5 hours in a humidity-controlled environment until the test environment is balanced to the relevant environment.

For confirmation of the effect on improvement of irreversible fluctuations by this invention, it is preferable to use the processed samples (after endurance treatment) for measurement of film retardation and viewing angles.

The inventors have also found that the retardation films of this invention can be obtained by using cellulose ester having a specific total acyl group replacement ratio, polyvalent alcohol ester plasticizer, and aromatic end ester plasticizer and employing a production method by which the radius of a free volume obtained by the Positron Annihilation Lifetime Measurement is in the range of 0.250 to 0.310 nm. Here, the acyl group replacement ratio can be measured in accordance with a measuring method defined in ASTM-D817-96.

Respective elements of this invention will be explained in detail.

<Cellulose Derivative>

This invention uses a cellulose derivative having low double refraction and positive wavelength dispersion characteristic as a preferable organic material for liquid crystal display films.

Cellulose derivatives available to this invention are cellulose ethers such as methyl cellulose, ethyl cellulose, hydroxy ethyl cellulose, hydroxy propyl cellulose, and cyano ethyl cellulose, and cellulose esters such as triacetyl cellulose (TAC), diacetyl cellulose (DAC), cellulose acetate propionate (CAP), cellulose acetate butylate (CAB), cellulose acetate phthalate, cellulose acetate trimellitate, and nitro cellulose. Among these, cellulose esters are preferable.

Celluloses as raw materials for cellulose derivatives available to this invention can be cotton linter, wood pulp, and kanaf although they are not limited. Cellulose derivatives obtained from these raw materials can be used singly or in combination at arbitrary ratios, but it is preferable to use 50 mass % or more of cotton linter.

The cellulose ester film has a greater modulus of elasticity as its molecular weight increases, but when the molecular weight goes too high, the cellulose ester solution becomes too viscous. This reduces the productivity of the cellulose ester film. The molecular weight (number average molecular weight (Mn)) of cellulose ester is preferably 40000 to 200000 and more preferably 100000 to 200000. The Mw/Mn ratio of cellulose ester used by this invention is preferably less than 4.0 and more preferably 1.4 to 2.3.

The mean molecular weight and molecular weight distribution of cellulose ester can be measured by a fast liquid chromatography. The ratio of mass mean molecular weight (Mw) to number average molecular weight (Mn) can be calculated from the results of measurement.

The measuring condition is as follows:

Solvent: Methylene chloride

Column: Shodex K806, K805, K803G (manufactured by Showa Denko K K). Three columns were used in connection.

Column temperature: 25° C.

Sample concentration: 0.1 mass %

Detector: RI Model 504 (manufactured by GL Science)

Pump: L6000 (manufactured by Hitachi Ltd.)

Flow rate: 1.0 ml/min

Calibration curve: Standard polystyrene STK (manufactured by Tosoh Corporation). Calibration curve using 13 samples of Mw=1,000,000 to 500. 13 samples should preferably be spaced approximately equally.

Preferable cellulose ester has acyl groups of 2 to 4 carbon atoms (per molecule) as substituents and satisfies Equations (I) and (II) (where X is the replacement ratio of acetyl group and Y is the replacement ratio of propionyl group or butyryl group) at the same time.

$$2.0 \leq X+Y \leq 2.6 \qquad \text{Equation (I)}$$

$$0 \leq X \leq 2.6 \qquad \text{Equation (II)}$$

Preferable cellulose ester is cellulose acetate propionate of $2.4 \leq X+Y \leq 2.6$, $1.4 \leq X \leq 2.3$, $0.1 \leq Y \leq 1.2$ (where $X+Y$ is the total acyl group replacement ratio (total acyl substitution degree)). More preferable cellulose ester is cellulose acetate propionate of $2.4 \leq X+Y \leq 2.6$, $1.7 \leq X \leq 2.3$, $0.1 \leq Y \leq 0.9$ (where $X+Y$ is the total acyl group replacement ratio). Incidentally, acyl group replacement ratio (acyl substitution degree) can be determined through a method prescribed in ASTM-D817-96. End groups which are not substituted by acyl groups usually exist as hydroxy groups. These cellulose esters can be synthesized by well-known methods.

<Solvent>

The cellulose derivative of this invention is dissolved in a solvent to form a dope. This dope is flow-casted onto a substrate to form a film. Since the solvent must be removed by evaporation after extrusion or flow-casting, the solvent should preferably be volatile.

An organic solvent which has a good solubility of the above cellulose derivatives is called a good solvent and its main effect is to solve the cellulose derivatives. Among the good solvents, organic solvents that are used in large quantity is called a main or primary (organic) solvent.

Typical good solvents are, for example, ketones such as acetone, methyl ethyl ketone, cyclopentanone, and cyclohexanone, ethers such as tetrahydrofuran (THF), 1,4-dioxane, 1,3-dioxorane, and 1,2-dimethoxyethane, esters such as methyl formate, ethyl formate, methyl acetate, ethyl acetate, amyl acetate, and γ-butyrolactone, methyl cellosolve, dimethyl imidazolynone, dimethyl formamide, dimethyl acetoamide, acetonitrile, dimethyl sulfoxide, sulfolane, nitro ethane, methylene chloride, and acetomethyl acetate.

Among the above solvents, preferable are 1,3-dioxorane, THF, methyl ethyl ketone, acetone, methyl acetate and methylene chloride.

In addition to the above organic solvent, the dope should preferably contain 1 to 40 mass % of alcohol of 1 to 4 carbon atoms (per molecule). Alcohols work as a gelation solvent which gelates a web (a dope film made by flowing the cellulose derivative dope over a support) when the ratio of alcohol in the solvent becomes greater during evaporation of the solvent from the dope flown over a metallic support, strengthen the web, and facilitates separation of the web from the support. Alcohols also work to accelerate dissolution of the cellulose derivative into non-chlorine organic solvent when the ratio of alcohols is less.

Typical alcohols of 1 to 4 carbon atoms (per molecule) are methanol, ethanol, n-propanol, iso-propanol, n-buthanol, sec-buthanol, tert-buthanol, and propylene glycol monomethyl ether. Among these, ethanol is preferable because it excels at stability of dope and has a comparatively-low boiling point, good drying property, and little toxicity. These organic solvents are called poor solvents because they have no ability to dissolve cellulose derivatives.

The most preferable solvent which can satisfy the above conditions and dissolve cellulose derivatives at high concentration is a mixture of methylene chloride and ethyl alcohol whose ratio is in the range of 95:5 to 80:20 or a mixture of methyl acetate and ethyl alcohol whose ratio is in the range of 60:40 to 95:5.

<Additives>

The retardation film of this invention can contain a plasticizer which gives workability, flexibility, and damp-proof to the film, an ultraviolet absorbent which gives an ultraviolet absorbing function to the film, an antioxidant which prevents deterioration of the film by oxidation, fine particles (matte material) which gives a slidability to the film, a retardation controller which controls the film retardation, and other additives.

<Plasticizer>

Plasticizers available to this invention are not limited particularly. However, to prevent hazes on the film and bleed-out or volatilization of the plasticizer from the film, the plasticizer should preferably contain functional groups which can react with the cellulose derivative by hydrogen bonds, etc.

Such functional groups are hydroxy, ether, carbonyl, ester, carboxylic residue, amino, imino, amide, imide, cyano, nitro, sulfonyl, sulfonic residue, phosphonyl, phosphonic residue groups. Among them, carbonyl, ester, and phosphonyl groups are preferable.

Typical plasticizers are phosphoric ester plasticizer, phthalic ester plasticizer, trimellitic ester plasticizer, pyromellitic plasticizer, polyvalent alcohol plasticizer, glycolate plasticizer, citrate ester plasticizer, fatty acid ester plasticizer, carboxylic ester plasticizer, and polyester plasticizer. Particularly, for effect of this invention, polyvalent alcohol plasticizers and ester plasticizers are preferable. Substantially, the film of this invention should preferably contain a polyvalent alcohol ester plasticizer and an aromatic end ester plasticizer to be explained later.

A polyalcohol ester consists of an ester of an aliphatic polyalcohol having a valence of two or mor and monocarboxylic acid, and preferably includes an aromatic ring or a cycloalkyl ring in a molecule.

A polyalcohol used in the present invention is represented by formula (1)

$$R_1\text{---}(OH)_n \qquad \text{Formula (1)}$$

Wherein: $R_1$ represents an organic acid having a valence of n, n represents a positive integer of 2 or more and OH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives. Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid. Examples of preferable alicyclic monocarboxylic acids include: cyclopentanecarboxylic acid, cyclohexanecarboxylic acid, cyclooctanecarboxylic acid, and derivatives thereof. Examples of preferable aromatic monocarboxylic acids include: (i) benzoic acid and toluic acid, both of which have benzene ring in which alkyl groups are introduced, (ii) biphenylcarboxylic acid, naphthalenecarboxylic and tetralincarboxylic acid having 2 or more benzene rings, and (iii) derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester. To be used for a polyalcohol ester, carboxylic acid may be used alone or in combination of two or more carboxylic acids. Hydroxyl groups in a polyalcohol may be completely esterified or only partially esterified remaining unsubstituted hydroxyl groups. Specific examples of polyalcohol esters are shown below:

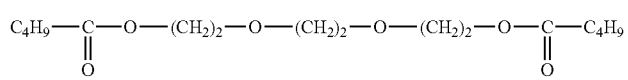

1

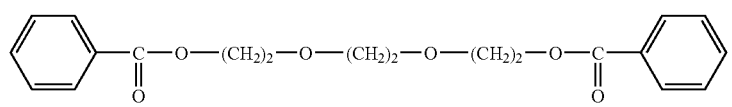

2

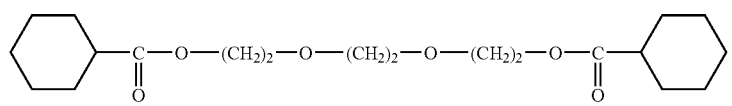

3

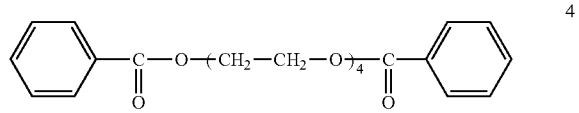

4

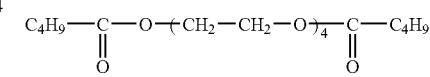

5

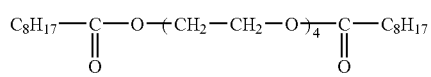

6

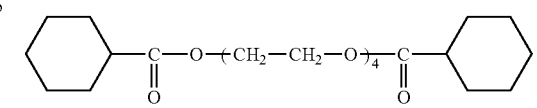

7

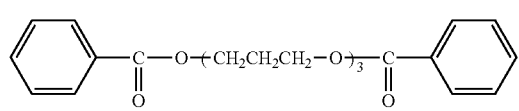

8

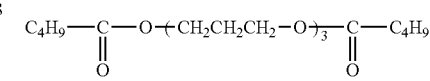

9

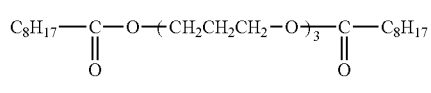

10

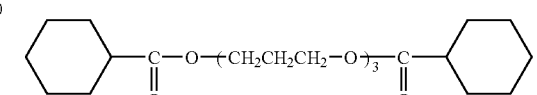

11

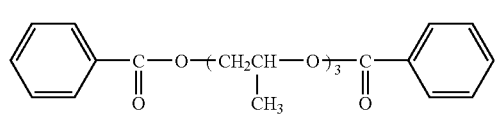

12

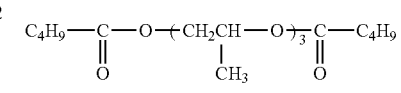

13

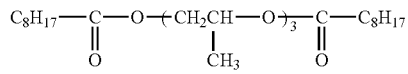

14

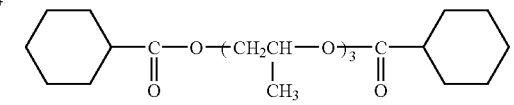

15

-continued
16
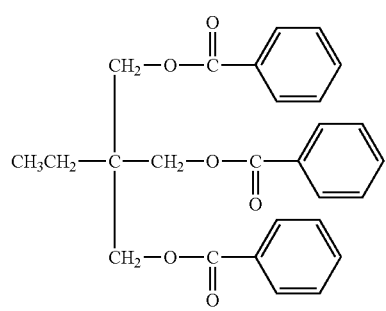
17
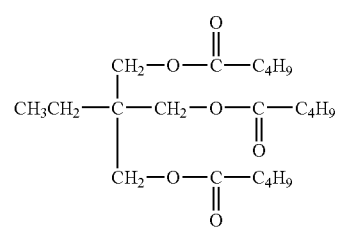
18
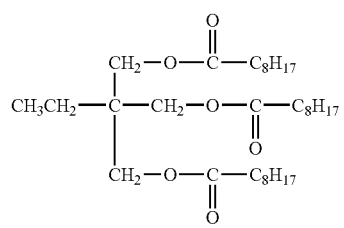
19
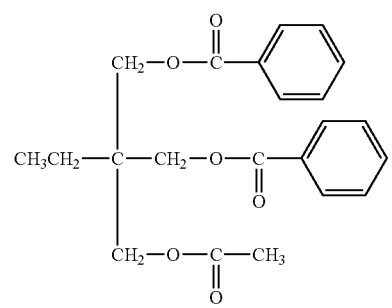
20
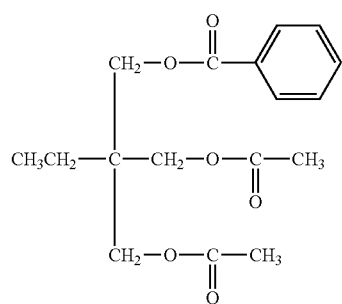
21
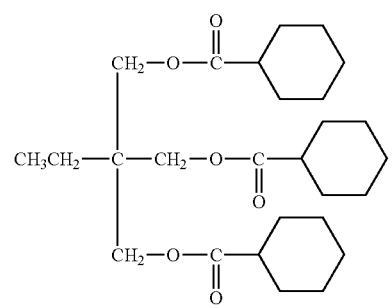
22
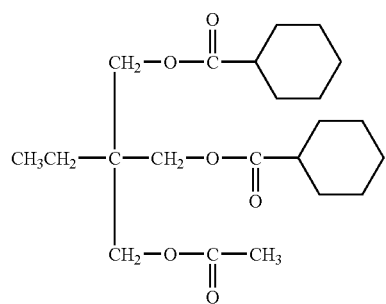
23
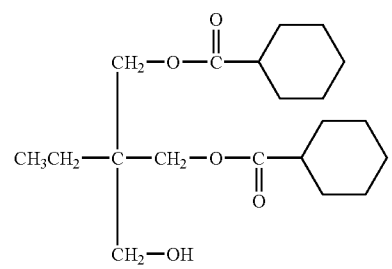

-continued
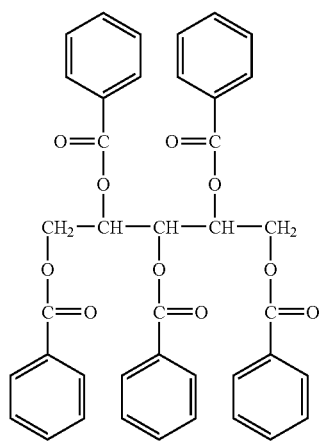
24
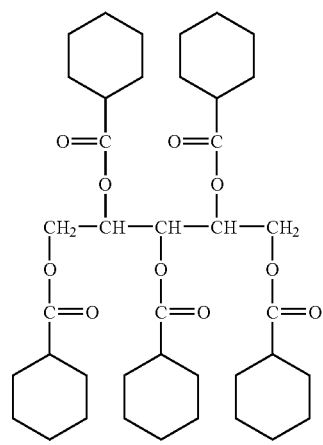
25
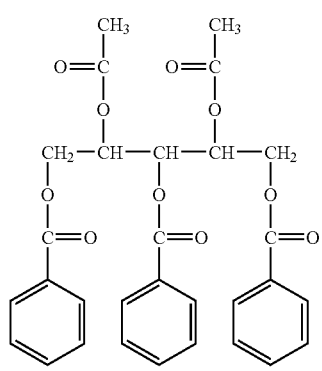
26
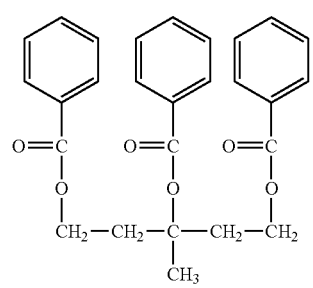
27
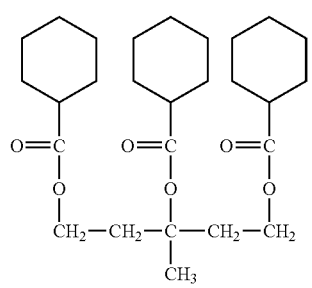
28
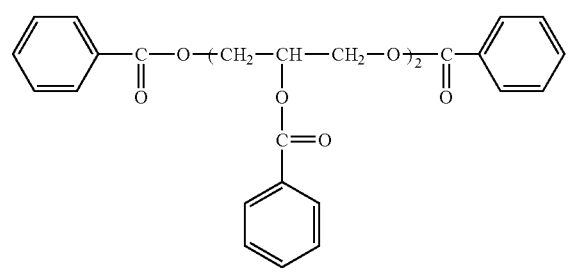
29
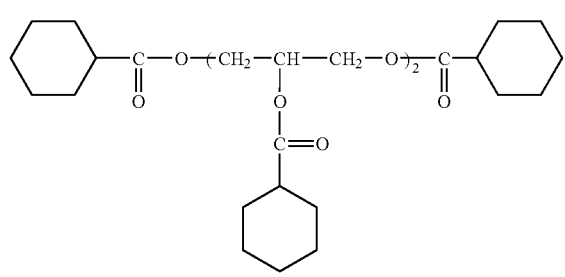
30

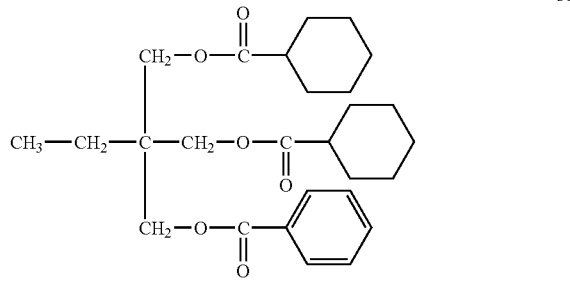

31

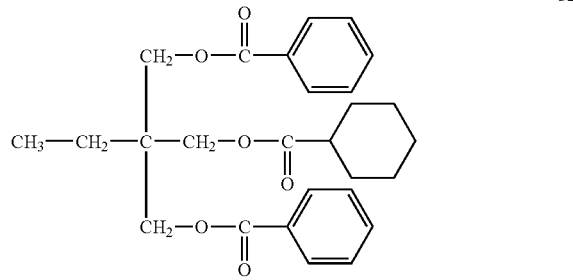

32

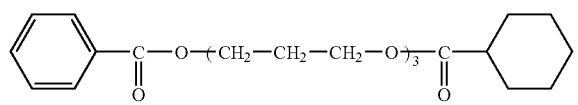

33

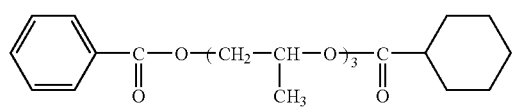

34

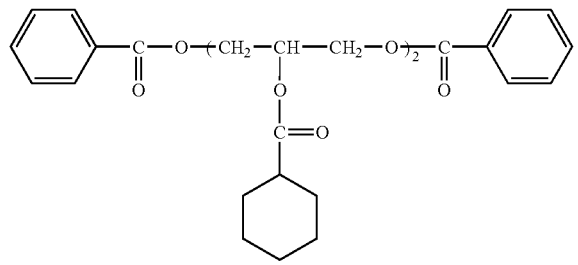

35

As for the content of the polyalcohol ester according the present invention, it is desirable to contain 1-15% by mass in a cellulose ester film, and especially it is desirable to contain 3-10% by mass.

(Ester Type Plasticizer)

The ester plasticizer used in the present invention is not specifically limited, however, an ester plasticizer which has an aromatic ring or a cycloalkyl ring in the molecule are applicable. For example, an ester plasticizer represented by the following Formula (1) are preferably used:

B-(G-A)$_n$-G-B     Formula (1)

where B represents benzene monocarboxylic acid group, G represents an alkylene glycol group having 2-12 carbon atoms, an aryl glycol group having 6-12 carbon atoms, or an oxyalkylene glycol group having 4-12 carbon atoms, A represents an alkylene dicarboxylic acid having 4-12 carbon atoms, or an aryl dicarboxylic acid group having 6-12 carbon atoms, and n represents an integer of 1 or more.

A compound represented by Formula (1) is structured by benzene monocarboxylic acid group represented with B, an alkylene glycol group or an oxyalkylene glycol group or an aryl glycol group represented with G, and an alkylene dicarboxylic acid group or an aryl dicarboxylic acid group represented with A and is prepared through a reaction similar to the preparation reaction of a common polyester plasticizer.

Examples of a benzene monocarboxylic acid component of the ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the ester plasticizer of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols. Since alkylene glycol having carbon atoms of 2-12 is especially excellent in compatibility with cellulose ester, it is especially desirable.

Examples of an oxyalkylene glycol component having 4-12 carbon atoms of the aromatic terminal ester of the present invention include: diethylene glycol, triethylene glycol, tetraethylene glycol, dipropylene glycol and tripropylene glycol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an arylene dicarboxylic acid component having 6-12 carbon atoms include: phthalic acid, terephthalic acid, 1,5-naphthalene dicarboxylic acid and 1,4-naphthalene dicarboxylic acid.

The number average molecular weight of the ester plasticizer used in the present invention is preferably 250-2000, and more preferably 300-1500. The acid value of the ester plasticizer used in the present invention is preferably not more than 0.5 mgKOH/g and more preferably not more than 0.3 mgKOH/g. The hydroxyl value of the ester plasticizer used in the present invention is preferably not more than 25 mgKOH/g and more preferably not more than 15 mgKOH/g. Examples of a synthetic method of an aromatic terminal ester plasticizer are shown below:

<Sample No.1 (Aromatic Terminal Ester Sample)>

In a container, 410 parts of phthalic acid, 610 parts of benzoic acid, 737 parts of dipropylene glycols and 0.40 parts of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated to 100 Pa and, finally, to $4.0 \times 10^2$ Pa at 200-230° C., while the distillate was removed. The product was filtered to obtain an aromatic terminal ester type plasticizer having the following features:

| | |
|---|---|
| Viscosity (25° C., mPa · s): | 43400 |
| Acid value: | 0.2 |

<Sample No.2 (Aromatic Terminal Ester Sample)>

An aromatic terminal ester having the following features was prepared in the same manner as Sample No. 1 except that 410 parts of phthalic acid, 610 parts of benzoic acid, 341 parts of ethylene glycol and 0.35 parts of tetra-isopropyl titanates (as a catalyst) were used.

| | |
|---|---|
| Viscosity (25° C., mPa · s): | 31000 |
| Acid value: | 0.1 |

<Sample No.3 (Aromatic Terminal Ester Sample)>

An aromatic terminal ester having the following features was prepared in the same manner as Sample No. 1 except that 410 parts of phthalic acid, 610 parts of benzoic acid, 418 parts of 1,2-dihydroxypropane and 0.35 parts of tetra-isopropyl titanates (as a catalyst) were used.

| | |
|---|---|
| Viscosity (25° C., mPa · s): | 38000 |
| Acid value: | 0.05 |

<Sample No.4 (Aromatic Terminal Ester Sample)>

An aromatic terminal ester having the following features was prepared in the same manner as Sample No. 1 except that 410 parts of phthalic acid, 610 parts of benzoic acid, 418 parts of 1,3-dihydroxypropane and 0.35 parts of tetra-isopropyl titanates (as a catalyst) were used.

| | |
|---|---|
| Viscosity (25° C., mPa · s): | 37000 |
| Acid value: | 0.05 |

Although concrete compounds of the aromatic terminal ester type plasticizer according to the present invention are shown below, the present invention is not limited to these.

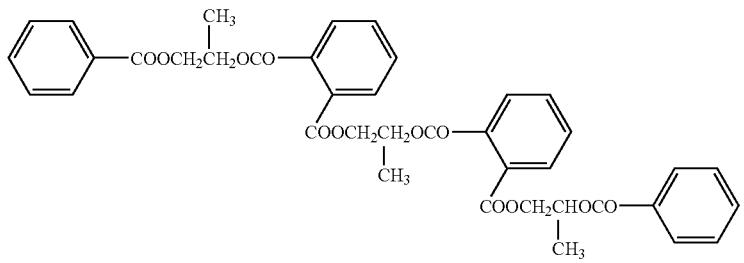

Mw: 696 (1)

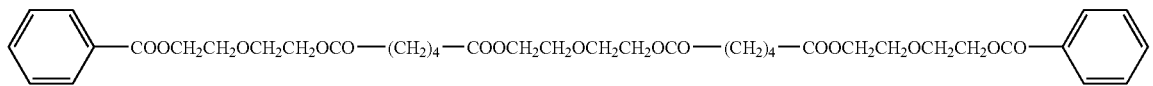

Mw: 746 (2)

-continued
(3)
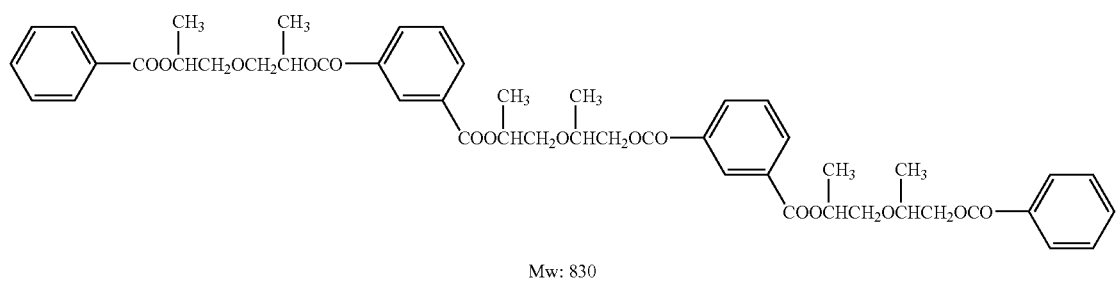
Mw: 830
(4)
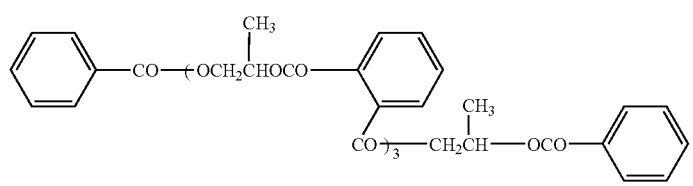
Mw: 886
(5)
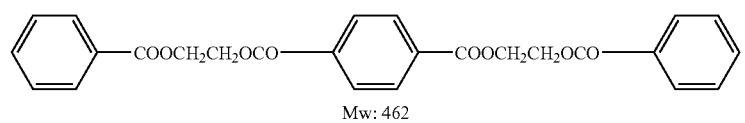
Mw: 462
(6)
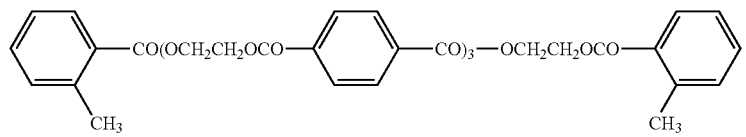
Mw: 874
(7)
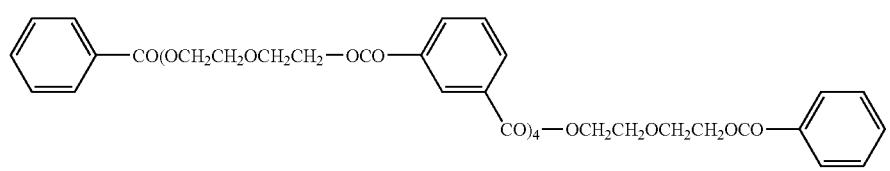
Mw: 1258
(8)
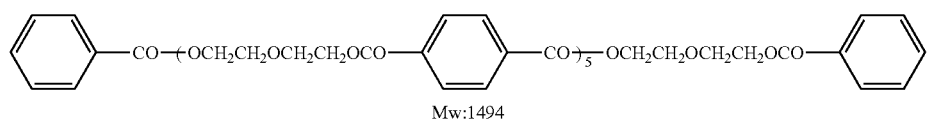
Mw: 1494
(9)
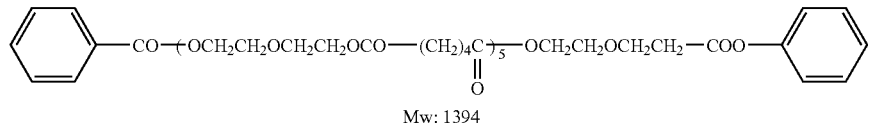
Mw: 1394

-continued

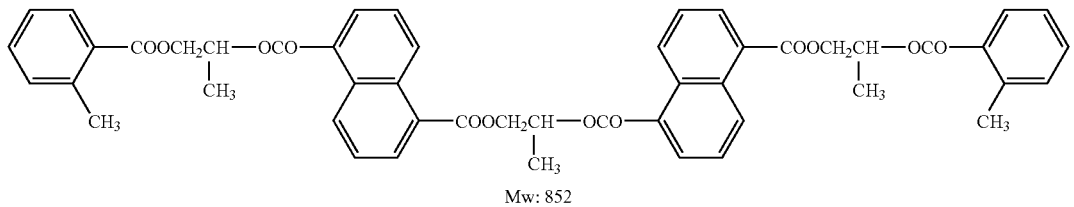
Mw: 852
(10)

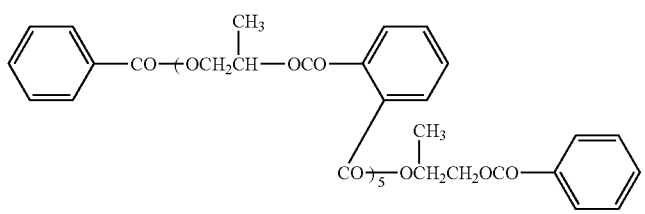
Mw: 1314
(11)

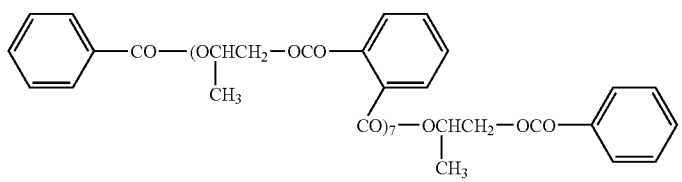
Mw: 1726
(12)

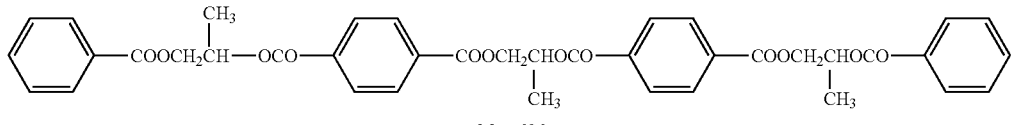
Mw: 696
(13)

These plasticizers can be used independently or as a mixture of two or more. As a used amount of plasticizer, an amount of 1% or less by mass to a cellulose derivative is not preferable, because there are few effects of reducing the water vapour permiability of a film, and when the amount exceeds 20% by mass, a plasticizer bleeds out from a film and the physical properties of a film deteriorate. Accordingly, the amount of 1 to 20% by mass may be preferable, 6 to 16% more preferable and 8 to 13% still more preferable.

(Ultraviolet (UV) Absorber)

It is desirable that a ultraviolet-ray absorbing ability is given to various optical films, such as a polarizer protection film, a retardation film, and an optical compensation film, from a viewpoint of deterioration prevention of a liquid crystal. Such ultraviolet-ray absorbing ability may be obtained by making a cellulose derivative to include a material which absorbs ultraviolet rays, or by providing a layer with ultraviolet-ray absorbing ability on a film which consists of a cellulose derivative.

As UV absorber with such ultraviolet-ray absorbing ability, an absorber excelling in the absorbing power for ultraviolet rays with a wavelength of 370 nm or less and having few absorption for a visible ray with a wavelength of 400 nm or more may be used preferably. As an example of the UV absorber used preferably, although for example a triazine type compound, an oxi- benzophenone type compound, a benzo- triazole type compound, a salicylate type compound, a benzophenone type compound, a cyanoacrylate type compound, a nickel complex salt type compound, etc. are may be listed, it is not limited to these. Moreover, a macromolecule UV absorber described in a official gazette of TOKKAIHEI No. 6-148430 may be also preferably used.

As an example of a UV absorber useful in the present invention, 2-(2'-hydroxy-5'-methylphenyl) benzotriazole, 2-(2'-hydroxy-3' and 5'-di- tert-butylphenyl) benzotriazole, 2-(2'-hydroxy-3'-tert-butyl-5'-methylphenyl) benzotriazole, 2-(2'-hydroxy-3' and 5'-di-tert-butylphenyl)-5-chloro benzotriazole, 2-(2'-hydroxy-3'-(3", 4", 5"6"-tetra-hydronalium phthalimide methyl)-5'-methylphenyl) benzotriazole, 2 and 2-methylene bis (4-(1, 1, 3, and 3-tetra-methyl butyl)-6-(2H-benzotriazole-2-yl) phenol), 2-(2'-hydroxy-3'-tert-butyl-5'-methylphenyl)-5-chloro benzotriazole, 2-(2H-benzotriazole-2-yl)-6-(normal chain and side chain dodecyl)-4-methyl phenol <<Tinuvin(TINUVIN)171>>, 2-octyl-3-[3-tert-butyl-4-hydroxy-5-(chloro-2H-benzotriazole-2-yl) phenyl] propionate and 2-ethylhexyl-3-[3-tert-butyl-4-hydroxy-5-(5-chloro-2H-benzotriazole-2-yl) phenyl] mixture of propionate <<Tinuvin (TINUVIN)109>>, 2-(2H-benzotriazole-2 yl)-4, 6-bis (1-methyl-1-phenyl ethyl) phenol <<Tinuvin 234>>, 2-(3-t-butyl-5-methyl-2 hydroxyphenyl) -5-chloro-benzotriazole <<Tinuvin 326>>etc. may be listed, however, it is not limited to these. Moreover, each Tinuvins of above-mentioned Tinuvins 109, Tinuvins 171, and Tinuvin 326 is a product of Chiba Specialty Chemicals Co., and can be used preferably.

As an example of a benzophenone type compound, although 2,4-dihydroxy benzophenone, 2, and 2'-dihydroxy-4-methoxybenzophenone, 2-hydroxy-4-methoxy-5-sulfo benzophenone, bis (2-methoxy-4-hydroxy-5-benzoyl phenyl methane), etc. may be listed, it is not limited to these.

Moreover, since the UV absorber which can be used for a retardation film in the present invention is excellent also in the coating characteristics of various coating layers, it is desirable to contain UV absorbers with the distribution coefficient of 9.2 or more described in Japanese Patent O.P.I. Publication No. 2000-187825, and especially it is desirable to use UV absorbers with the distribution coefficient of 10.1 or more.

Moreover, a macromolecule UV absorber (or ultraviolet-ray absorptivity polymer) described in TOKKAIHEI No. 6-148430 and Japanese Patent O.P.I. Publication No. No. 2002-47357 can be used preferably. A macromolecule UV absorber described in general formula (1) or general formula (2) of Japanese Patent O.P.I. Publication No. 6-148430, or general formulas (3), (6), and (7) in Japanese Patent O.P.I. Publication No. 2002-47357, can be used especially preferably.

Moreover, a compound having 1, 3, and 5-triazine ring can be preferably used as a UV absorber for a retardation film of the present invention. This compound can be used also as a retardation regulator.

As an added amount of these compounds, an added amount of 0.1 to 5.0% at a mass rate to a cellulose derivative is desirable, and 0.5 to 1.5% is still more desirable.

(Antioxidant)

An antioxidant is also called antidegradant. When a liquid crystal image display device etc. is placed in the state of high humidity high temperature, deterioration of a retardation film may occur. Since, for example, an antioxidant has a function which delays or prevents a retardation film from decompositioning by halogen in residual solvents in the retardation film, or by phosphoric acid of a phosphoric acid type plasticizer, etc., it is desirable to make it contain in the above-mentioned retardation film.

As such an antioxidant, a hindered-phenol type compound is used preferably. For example, 2,6-di-t-butyl-p-cresol, a penta ERIS retail-tetrakis [3-(3,5-di- t-butyl-4 hydroxyphenyl) propionate], triethylene glycol-bis [3-(3-t-butyl-5-methyl-4 hydroxyphenyl) propionate], 1,6-dihydroxyhexane-bis [3-(3,5-di- t-butyl-4 hydroxyphenyl) propionate], 2 and 4-bis-(n-octylthio)-6-(4-hydroxy-3,5-di-t-butyl anilino)-1,3, and 5-triazine, 2 and 2-chio-diethylenebis [3-(3,5-di- t-butyl-4 hydroxyphenyl) propionate], Octadecyl-3-(3,5-di- t-butyl-4 hydroxyphenyl) propionate, N and N'-hexamethylene bis (3,5-di-t-butyl-4-hydroxy-hydrocinnamide), 1,3, and 5-trimethyl-2,4,6-tris (3,5-di-t-butyl-4-hydroxy benzyl) benzene, tris-(3,5-di-t-butyl-4-hydroxy benzyl)-isocyanurate, etc. may be listed. In particular, 2,6-di- t-butyl-p-cresol, a penta erisretil-tetrakis [3-(3,5-di-t-butyl-4 hydroxyphenyl) propionate], and a triethylene glycol-bis [3-(3-t-butyl-5-methyl-4 hydroxyphenyl) propionate] are desirable. Moreover, for example, phosphorus type processing stabilizers, such as metal deactivator of hydrazine types, such as an N and N'-bis [3-(3,5-di- t-butyl-4 hydroxyphenyl) propionyl] hydrazine, and tris (2,4-di-t-butylphenyl) phosphight may be used together.

As an added amount of these compound, an added amount of 1 ppm to 1.0% at a mass rate to a cellulose derivative is desirable, and 10-1000 ppm are still more desirable.

(Matting Agent)

In the cellulose derivative in the present invention, in order to give sliding property, a matting agent such as fine particles can be added. As the fine particles, fine particles of an inorganic compound or fine particles of an organic compound may be listed up.

As an added amount of fine particles, an amount of 0.01-1.0 g per an area of 1 $m^2$ of a retardation film are desirable, 0.03-0.5 g are more desirable, and 0.08-0.3 g are still more desirable. With this, it is desirable to form a convex of 0.1-1-micrometer on a surface of a retardation film, and sliding property is given to the film.

As fine particles added in a retardation film, a silicon dioxide, titanium dioxide, aluminium oxide, zirconium oxide, calcium carbonate, calcium carbonate, talc, clay, a baked caolin, a baked calcium silicate, hydration silicic acid calcium, aluminium silicate, magnesium silicate, and calcium phosphate can be mentioned as an example of an inorganic compound. Since turbidity becomes low and the haze of a film can be made small, particles containing silicon is desirable, and especially a silicon dioxide is desirable.

Fine particles like a silicon dioxide is subjected to a surface treatment with an organic substance in many cases. It is desirable that those fine particles can make the haze of a film small. As a desirable organic substance in the surface treatment, halo silane, alkoxy silane, silazane, siloxane, etc. can be mentioned.

Silicon dioxide fine particles can be obtained, for example, by burning a mixture of vaporized silicon tetrachloride and hydrogen in air at 1000-1200° C.

Fine particles of a silicon dioxide having a primary average grain diameter of 20 nm or less and an apparent specific gravity of 70 or more g/L are desirable. Particles having a primary average grain diameter of 5-16 nm are more desirable. Particles having a primary average grain diameter of 5-12 nm are still more desirable.

These fine particles provide sliding property by forming a secondary aggregate in a film and forming unevenness in a film surface. A smaller average diameter of primary particles is desirable, because a haze is low. An apparent specific gravity of 90-200 g/L or more is more desirable, and 100-200 g/L or more is more desirable. A lager apparent specific gravity is desirable, because it becomes possible to make high-concentration fine particle dispersion liquid, and an occurrence of a haze and a big coagulum is few. Suppose that a liter is expressed with L in the present invention.

As fine particles of a desirable silicon dioxide, fine particles marketed by product names of aerosil R972, R972V, R974 and R812, 200, 200V and 300, R202, OX50, and TT600 (manufactured by Japanese Aerosil Co.) can be mentioned, for example. Aerosil 200V, R972, R972V, and R974, R202 and R812 can be used preferably. As fine particleses of zirconium oxide, fine particles marketed by product names of aerosils R976 and R811 (manufactured by Japanese Aerosil Co.) can be used, for example.

Among the above fine particleses, aerosil 200V, aerosil R972V, and aerosil TT600 are especially desirable, because the effect that they make the turbidity of a retardation film of the present invention lower and make a friction factor lower is larger.

As an example of fine particles of an organic compound, a silicone resin, a fluorine plastic, and acryl resin can be mentioned. Among them, a silicone resin is desirable, and especially fine particles having a three dimensional network structure are desirable, for example, toss pearl 103, toss pearl 105, toss pearl 108, toss pearl 120, toss pearl 145, toss pearl 3120 and toss pearl 240 (manufactured by Toshiba Silicone Co.) can be mentioned.

In measurement of a primary average grain diameter of fine particles, particles are observed with a transmission electron microscope (magnification of 500,000 to 2000,000) so as to obtain grain diameters of 100 particles, and a primary average grain diameter is obtained by calculating the average value of the grain diameters.

Moreover, the apparent specific gravity of the above-mentioned description can be calculated by the following formula in which a weight is measured by taking a fixed quantity of silicon dioxide fine particles in a measuring cylinder.

Apparent specific gravity (g/L)=the mass (g) of silicon dioxide/the volume (L) of silicon dioxide The inorganic fine particles added here can give sliding property to a film surface.

<Film Production>

Hereafter, a desirable film-production method of a retardation film according to the present invention is explained.

1) Dissolution Process:

In this process, cellulose ester is dissolved in an organic solvent which mainly contains good solvent, in a vessel while stirring a mixture of a cellulose ester, an additive and a solvent so as to form a dope or an additive solution is mixed in a cellulose derivative solution so as to form a dope.

As a method of dissolving a cellulose derivative by ordinary pressure, although various methods such as a method of performing under the ambient pressure, a method of performing under a temperature below the boiling point of the main solvent, a method of performing under a temperature above the boiling point of the main solvent while applying a pressure, a method of performing a cooling dissolving method described in the official gazettes of Japanese Patent O.P.I. Publication No. 9-95544, Japanese Patent O.P.I. Publication No. 9-95557 and Japanese Patent O.P.I. Publication No. 9-95538, a method of performing under a high pressure described in the official gazette of Japanese Patent O.P.I. Publication No. 11-21379 can be employed, a method of performing under a temperature above the boiling point of the main solvent while applying a pressure especially is desirable.

The concentration of the cellulose derivative in a dope is desirably 10-35% by mass. After adding dissolving or dispersing an additive in the dope while dissolving or after dissolving, the dope is filtered with a filer media and degassed, and then the dope is sent to the following manufacturing process with a feeding pump.

2) Casting Process:

In this casting process, a dope solution is sent to a high pressure die using a feeding pump (for example, a high pressure metering gear pump) and cast on an endless metal belt, for example, a stainless steel belt, or on a rotating cylindrical metal support at a prescribed position from the high pressure die.

A high pressure die is preferable since uniform thickness is more easily obtained by adjusting the slit shape at the tip of a die. A high pressure die includes a coat-hanger die and a T die either of which are preferably used. Two high pressure dies may be provided simultaneously on a metal support to increase the film forming rate by dividing the amount of dope and by superimposing two film layers. Or it is also desirable to obtain a film of a laminated structure by a multi casting method to conduct casting of plural dope solutions simultaneously.

3) Solvent Evaporation Process:

A web (a film of a dope after the dope is cast on a metal support is referred to as a web) is heated on a metal support to evaporate the contained solvent until the web becomes peelable.

The following methods may be used to promote evaporation of a solvent from a web: blowing from above the web; heating a metal support from a back surface using a liquid heat medium; and heating from both surfaces of a web using radiant heat. Among these methods, the method to heat a metal support from a back surface using a liquid heat medium is preferable with respect to drying efficiency, however the above methods may also be used in combination. In the case of heating a back surface using a liquid heat medium, it may be preferable to heat at a temperature lower than the boiling point of the main solvent of an organic solvent used in the dope or lower than the boiling point of an organic solvent having a lowest boiling point.

4) Peeling Process

A web dried on a metal support is peeled from the metal support at a prescribed position. The peeled web is sent to the next process. If the amount of the residual solvent (below-mentioned formula) in a web is too much at the point of peeling, peeling is difficult and if the amount of the residual solvent is too small, partial peeling of the web may occur prior to the point of peeling.

As an alternate method to increase the formation rate of a web (by peeling while an amount of the residual solvent is as much as possible, the formation rate of a web can be increased), a gel casting method may be used. This method enables a higher forming rate of a web since a web is peeled while the web still contains a high percentage of solvent. In a gel casting method, the gel is formed by: adding a considerable amount of a poor solvent in a dope which forms a gel after casting the dope on a metal support; or lowering the temperature of the metal support to facilitate formation of a gel. By forming a gel, the mechanical strength of a web increases and an early peeling of the web becomes possible, resulting in a higher web formation rate.

With regard to the amount of the residual solvent on the metal support, it may be preferable to peel the web in a range of 5 to 150% by mass depending on the degree of a drying condition and a length of the metal support. In the case of peeling it when the amount of the residual solvent is too much, if the web is to soft, the web may lose a flatness at the time of peeling, or apt to cause twist or longitudinal streak by the peeling tension. Accordingly, the amount of the residual solvent when peeling is determined in view of both of an economic speed and a quality.

In the present invention, the temperature at the point of peeling from the metal support is preferably controlled between −50° C. and 40° C., is more preferably 10° C. to 40° C., and is still more preferably 15° C. to 30° C.

The amount of residual solvent at the point of peeling on the metal support is preferably 10 to 150% by weight, is more preferably 10 to 120% by weight.

The amount of the residual solvent is defined by the following equation:

$$\text{Residual solvent content (\% by weight)} = \{(M-N)/N\} \times 100$$

where M represents weight of samples of the web taken during or after the manufacturing process, and N represents weight of the same sample after it has been dried at 115° C. for one hour.

5) Drying and Stretching Process:

After peeling, the web is dried using a drying equipment which conveys the web by passing it alternately among a plurality of rolls arranged in the drying equipment, and/or a tenter apparatus which clips the both ends of a web and conveys it with a clip, thereby drying the web.

In the present invention, it is desirable to stretch using a tenter apparatus as a method of stretching 1.0 to 2.0 times to in a width direction between clips. Furthermore, biaxial stretching in a longitudinal direction and a transverse direction are preferable. In the biaxial stretching, by slacking to 0.8 to 1.0 times in the longitudinal direction, a desired retardation value can be obtained. A stretching magnification is set up according to a target optical characteristics (Ro, Rt). Moreover, when manufacturing a retardation film according to the present invention, a uniaxial stretching can also be carried out in the longitudinal direction. A temperature in the case of stretching is 80 to 180° C., preferably 90 to 160° C., and the amount of residual solvents at the time of stretching is 5 to 40% by mass, preferably 10 to 30% by mass,.

It was found out that as a retardation film, it is possible to provide a retardation film excellent in durability with little change of Ro and Rt with the above under conditions on which humidity is changed.

A general method of drying is to blow hot air on both surfaces of the web, however, a method to apply microwave is also possible. Too fast drying rate tends to result in loss of flatness of a web in the final stages of production. Usually, drying is carried out between 40 and 250° C. Drying temperature, amount of airflow, and drying duration depend on the type of solvent used in the web. Drying conditions may be appropriately selected depending on the type or the combination of solvent.

Moreover, as for a retardation film of the present invention, it is desirable that the free volume radius obtained by a positron annihilation lifetime spectroscopy is 0.250-0.310 nm.

The free volume in the present invention represents vacant area which is not occupied by the cellulose ester chain. This free volume can be measured using positron annihilation lifetime spectroscopy. More specifically, by measuring the time from injection of positrons into a cellulose ester film to the annihilation of the positrons, namely annihilation lifetime of positrons, size and numerical concentration of free volume holes are nondestructively estimated from the annihilation lifetime of positrons. (Measurement of Free Volume Radius by Positron Annihilation Lifetime Spectroscopy, and Free Volume Parameter)

A positron annihilation lifetime and relative intensity were measured under the following measurement condition.

(Measurement Condition)

| | |
|---|---|
| Positron source: | 22NaCl (intensity: 1.85 MBq) |
| Gamma-ray detector: | Plastic scintillator + Photomultiplier tube |
| Apparatus time resolution: | 290 ps |
| Measurement temperature: | 23° C. |
| Total number of counts: | 1 million counts |
| Specimen size: | 20 mm × 15 mm × 2 mm |

20 pieces of 20 mm×15 mm sized films were piled to prepare an about 2 mm thick sample. The sample was dried under vacuum 24 hours.

| | |
|---|---|
| Irradiation area: | A circle of about 10 mm in diameter |
| Time per channel: | 23.3 ps/ch |

According to the above measurement condition, positron annihilation lifetime spectroscopy was carried out. A three component analysis using a nonlinear least-square method was carried out for the obtained results. When the annihilation times were referred to as, in small order, $\tau1, \tau2$ and $\tau3$ and the corresponding intensities were referred to as I1, I2 and I3 (I1+I2+I3=100%), respectively, using the largest annihilation time $\tau3$, a free volume radius R3 (nm) was determined using the following formula. The larger the $\tau3$ value is, the larger the estimated free volume is.

$$\tau3 = (1/2)\,[(1 - \{R3/(R3+0.166)\} + (1/2\pi)\sin\{2\pi R3/(R3+0.166)\}]^{-1}$$

where, 0.166 (nm) represents the thickness of the electronic layer which is exuding from the wall of a hole.

The above measurements were repeated twice and the mean values were calculated for the determination.

Evaluation of a free volume in polymer by positron annihilation spectroscopy is explained in, for example, MATERIAL STAGE vol.4, No.5, 2004, pp. 21-25, The TRC News, No. 80 (July, 2002) PP. 20-22 (published by Toray Research Center), and "BUNSEKI (Analysis)", 1988, pp.11-20".

The free volume radius of the retardation film of the present invention is preferably 0.250-0.310 nm and is more preferably 0.270-0.305 nm. In an industrial process, it is rather difficult to produce a cellulose ester retardation film having a free volume radius of less than 0.250 nm. Further, in a conventional retardation film having a free volume radius larger than 0.310 nm, patch of retardation becomes to occur easily under high temperatures and high humidity.

The method of controlling the free volume radius of the retardation film containing a low volatile plasticizer and cellulosic derivative in a prescribed range is not specifically limited, however, the following method may be applicable.

A retardation film having a free volume radius of 0.250-0.310 nm and a free volume parameter of 1.0-2.0, both of which are determined by positron annihilation lifetime spectroscopy may be obtained, for example, by the following method: casting a dope containing a polyalcohol ester, a polycarboxylic acid ester, and a cellulose ester to form a web; stretching the web while the web contains residual solvent; drying the web until the amount of residual solvent decreases to 0.3% to obtain a cellulose ester film; (iv) heat treating the cellulose ester film at 105-150° C. in a film transportation process under a circumstance in which the rate of atmosphere replacement of not less than 12 times/h, or more preferably 12-45 times/h.

The rate of atmosphere replacement is the number of times replacing the atmosphere of a heat treatment chamber by fresh-air per unit time, provided that the volume of the heat treatment chamber is expressed as V (m$^3$) and the amount of fresh-air sent to the heat treatment chamber is expressed as FA (m$^3$/h). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=FA/V (times/h)

When the heat treatment temperature exceeds 155° C., or when it is lower than 105° C., the effect of the present invention tends not be acquired.

As the operating temperature, it is still more preferable that the operating temperature is in the range of 110-150° C. Further, preferable is that the heat treatment is carried out under the condition in which the rate of atmosphere replacement is 12 times/h or more. When it is less than 12 times/h, the effect of the present invention tends not be acquired.

When the rate of atmosphere replacement is 12 times/h or more, the concentration of the plasticizer evaporated from the retardation film in the atmosphere is thoroughly reduced, accordingly, re-deposition of the plasticizer to the retardation film is also reduced. This is assumed to contribute in attaining the effect of the present invention. Usually, the drying process is conducted with the Rate of atmosphere replacement of 10 times/hours. When the rate of atmosphere replacement is increased more than necessary, the production cost increases and due to the fluttering of the web, retardation patch increases. Accordingly, it is not recommended that the rate of atmosphere replacement is increased more than necessary, however, after the web was thoroughly dried and the amount of residual solvent is considerably decreased, it can be increased. However, the rate of atmosphere replacement of 45 times/h or more is not practical since the production cost drastically increases. The heat treatment under the rate of atmosphere replacement of 12 times/h or more is preferably carries out within 1 minute –1 hour. If the treatment time is less than 1 minute, the free volume radius within a prescribed range may be difficult to obtain, while, when it is not more than 1 hour, the change of retardation value is allowable.

Further, in this process, a pressurizing treatment of the retardation film in the thickness direction may also be effectively carried out to control the free energy volume radius and the free volume parameter within more preferable range. The pressure is preferably 0.5-10 kPa. The amount of residual solvent at the stage when the pressurizing treatment is carried out is preferably less than 0.3. At 0.3% or more, a free volume radius cannot fully be reduced.

When a retardation film is not subjected to the above mentioned treatments, the free volume radius may become larger than 0.315.

The thickness of a retardation film of the present invention is 10 to 50 μm. When thickness is not smaller than 10 μm, since it is too thin film, its mechanical strength becomes insufficient so that troubles such as breaking tends to take place at the time of production and a film surface condition becomes bad. When it is not larger than 50 μm, a free volume radius tends to become within a preferable range and it is preferable for the present invention.

The in-plane retardation $R_o$ of a retardation film of the present invention is 30 to 100 nm, more preferably 30 to 65 nm.

The thickness direction retardation $R_t$ of a retardation film of the present invention is 100 to 300 nm, more preferably 110 to 150 nm.

S represented by the above formula (iii) represents a retardation per a unit thickness, S is preferably within a range of 0.002 to 0.030, more preferably 0.003 to 0.015. If it is not larger than 0.002, whitening in a liquid crystal display device tends to take place and it exceeds 0.030, a deterioration of a liquid crystal display device due to the influence of moisture tends to take place.

(Polarizer)

As a polarizer, one which is prepared by stretching and dying a polyvinyl alcohol based film with iodine is preferably used. Especially it is preferable that the above polarizer is cast employing ethylene-modified polyvinyl alcohol at an ethylene unit content of 1-4 mol %, a degree of polymerization of 2,000-4,000 and a saponification ratio of 99.0-99.99 mol %, and is prepared employing an ethylene-modified polyvinyl alcohol film at a hot-water cutting temperature of 66-73° C. Further, in order to decrease color spots, it is more preferable that the difference of the hot water cutting temperature between two points 5 cm apart in the TD direction is at most 1° C. Still further, in order to decrease color spots, it is still more preferable that the difference of the hot water cutting temperature between two points 1 cm apart in the TD direction is at most 0.5° C.

A polarizer using this modified polyvinyl alcohol film is especially preferably used for a large scale liquid crystal device, because it is excellent in a polarizing capability and a durability and further it has less color irregularities (color spots).

Employed as the ethylene-modified polyvinyl alcohol (being the ethylene-modified PVA) may be those which are prepared in such a manner that ethylene-vinyl ester based polymers, prepared by copolymerizing ethylene and vinyl ester based monomers, are saponified in which vinyl ester units are employed as vinyl alcohol units. Examples of the above vinyl ester based monomers include vinyl formate, vinyl acetate, vinyl propionate, vinyl valerate, vinyl laurate, vinyl stearate, vinyl benzoate, vinyl pivaliate, and versatic acid vinyl esters. of these, it is preferable to employ vinyl acetate.

The content of ethylene units (the copolymerized amount of ethylene) in the ethylene-modified PVA is commonly 1-4 mol %, is preferably 1.5-3 mol %, is still more preferably 2-3 mol %.

When the content of ethylene units is within this range, the polarizing performance and the durability are enhanced and color spots are decreased.

Further, as to ethylene modified polyvinyl alcohol, monomers listed below can be copolymerized with vinyl ester based monomers. When copolymerizing with vinyl ester based monomers, a preferable range is not more than 15 mol %, more preferably not more than 5 mol %.

Examples of such copolymerizable monomers with vinyl ester based monomers include olefins having 3-30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitriles such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylene-modified PVA composing the polarizer and of PVA of the polarizing film is commonly 2,000-4,000, is preferably 2,200-3,500, but is more preferably 2,500-3,000 in terms of polarizing performance and durability. When the degree of polymerization of ethylene-modified PVA is at most 2,000, the polarizing performance and durability of the polarizing film are undesirably degraded. On the other hand, the degree of polymerization of at most 4,000 is preferred since color spots of the polarizer are hardly formed.

The degree of polymerization of the ethylene-modified PVA refers to the weight average degree of polymerization. This weight average degree of polymerization is a value obtained by performing GPC measurement at 40° C. employing hexafluoroisopropanol (HFIP) added with 20 millimol/liter of sodium trifluoroactate in the moving phase employing monodispersed PMMA as a standard product.

In view of polarization performance and durability of a polarizing film, the ratio of saponification of the ethylene-modified PVA constituting the polarizer is preferably 99.0-99.99 mol %, is more preferably 99.9-99.99 mol %, but is most preferably 99.95-99.99 mol %.

Although a method to produce an ethylene-modified PVA film may not be limited specifically, the extrusion casting method and the melt extrusion method may be preferable to obtain a good ethylene-modified PVA film. The resulting ethylene-modified PVA film is, if necessary, dried and thermally treated.

Cited as solvents to dissolve the ethylene-modified PVA employed during production of ethylene-modified PVA film may, for example, be dimethylsulfoxide, dimethylformamide, dimethylacetamide, N-methylpyrrolidone, ethylene glycol, glycerin, propylene glycol, triethylene glycol, tetraethylene glycol, trimethylolpropane, ethylenediamine, diethylenetriamine, and water. These may be employed individually or in combination of at least two types. Of these, suitably employed is dimethylsulfoxide and water, or a mixed solvent of glycerin and water.

The ratio of ethylene-modified PVA, incorporated in an ethylene-modified PVA solution or water-containing ethylene-modified PVA employed during production of the ethylene-modified film, varies depending on the degree of polymerization of the ethylene-modified PVA, but is commonly 20-70% by weight, is preferably 25-60% by weight, but is more preferably appropriately 30-55% by weight, but is most preferably 35-50 by weight. When the ratio of the ethylene-modified PVA exceeds 70% by weight, viscosity of the ethylene-modified PVA solution or the water-containing ethylene-modified PVA becomes excessively high, whereby it becomes difficult to prepare a film without foreign matter and defects due to difficult filtration and defoaming. On the other hand, when the ratio of the ethylene-modified PVA is at most 20% by weight, the viscosity of the ethylene-modified PVA solution or the water-containing ethylene-modified PVA becomes excessively low, whereby it becomes difficult to prepare a PVA film at the targeted thickness. Further, if desired, plasticizers, surface active agents, and dichroic dyes may be incorporated in the above ethylene-modified PVA solution or water-containing ethylene-modified PVA.

During production of the ethylene-modified PVA film, it is preferable to incorporate polyhydric alcohols as a plasticizer. Examples of polyhydric alcohols include ethylene glycol, glycerin, propylene glycol, diethylene glycol, diglycerin, triethylene glycol, tetraethylene glycol, and trimethylolpropane. These may be employed individually or in combinations of at least two types. Of these, in view of orientation enhancement effects, diglycerin, ethylene glycol, and glycerin are preferable.

The added amount of polyhydric alcohols is preferably 1-30 parts by weight with respect to 100 parts by weight of the ethylene-modified PVA, is more preferably 3-25 parts by weight, but is most preferably 5-20 parts by weight. When the added amount is at most 1 part by weight, dying properties and orientation properties are occasionally degraded, while when it exceeds 30 parts by weight, the ethylene-modified film becomes excessively flexible, whereby handling properties tend to be degraded.

During production of the ethylene-modified PVA film, it is preferable to incorporate surface active agents. The types of surface active agents are not particularly limited, but nonionic or cationic surface active agents are preferred. Examples of suitable anionic surface active agents include carboxylic acid types such as potassium laurate, sulfuric acid ester types such as octyl sulfate, and sulfonic acid types such as dodecylbenznene sulfonate. Examples of suitable nonionic surface active agents include alkyl ether types such as polyoxyethylene oleyl ether; alkyl phenyl ether types such as polyoxyethylene octyl phenyl ether; alkyl ester types such as polyoxyethylenelaurate; alkylamine types such as polyoxyethylene lauryl aminoether; alkylamide types such as polyoxyethylene lauric acid amide; polypropylene glycol ether types such as polyoxyethylene polyoxypropylene ether; alkanol amide types such as oleic acid diethanolamide; and allyl phenyl ether types such as polyoxyalkylene phenyl ether. These surface active agents may be employed individually or in combinations of at least two types.

The added amount of surface active agents is preferably 0.01-1 part by weight with respect to 100 parts by weight of the ethylene-modified PVA, is more preferably 0.02-0.5 part by weight, but is most preferably 0.05-0.3 part by weight. When the added amount is at most 0.01 part by weight, effects to improve film casting properties and peeling properties are hardly exhibited, while when it exceeds 1 part by weight, surface active agents are dissolved out onto the surface of the ethylene-modified PVA film to result in blocking, whereby handling properties tend to be degraded.

The thickness of the ethylene-modified PVA film employed to prepare a polarizer is preferably 10-50 μm, but is more preferably 20-40 μm. When the thickness is at most 10 μm, uniform stretching is hardly performed due to excessively low film strength, whereby color spottings of the polarizing film tend to be generated. On the other hand, when the thickness exceeds 50 μm, during production of a polarizing film via uniaxial orientation of the ethylene-modified PVA film, the thickness tends to vary due to neck-in at the ends, whereby color spottings of the polarizing film tend to be undesirably enhanced.

Further, to produce a polarizing film employing an ethylene-modified PVA film, for example, the ethylene-modified PVA film may be dyed, uniaxially stretched, fixed and dried, if desired, thermally treated. The order of the dying, uniaxial stretching, and fixing is not particularly limited. Further, the uniaxial stretching may be repeated at least twice.

Dying may be performed at any time such as prior to uniaxial stretching, during uniaxial stretching, or after uniaxial stretching. As dyes for dying, iodine-potassium iodide and dichroic dyes may be employed individually or in combinations of at least two types. Dying is commonly performed by immersing a PVA film into a solution incorporating the above dyes. Alternatively, the above dyes may be blended into a PVA film during casting. The above dying conditions and methods are not particularly limited.

It is possible to conduct uniaxial stretching employing either a wet stretching method or a dry heat stretching method, and in heated water (a solution incorporating the above dyes or the fixing bath, described below, may be employed) or in an atmosphere employing the ethylene-modified PVA film after water absorption. The temperature during stretching is not particularly limited. When the ethylene-modified PVA film is stretched in heated water (being wet system stretching), the stretching temperature is preferably 30-90° C., while in the case of dry heat stretching, it is preferably 50-180° C. The stretching factor (the total stretching factor in the case of multistage uniaxial stretching) is preferably at least 4 in terms of polarization performance of a polarizing film, but is most preferably at least 5. The upper limit of the stretching factor is not particularly limited. However, the stretching factor is preferably at least 8, since uniform stretching is readily performed. The film thickness after stretching is preferably 2-20 μm, is more preferably 5-20 μm, but is most preferably 5-15 μm.

To strengthen adsorption of the above dyes onto the ethylene-modified PVA film, a fixing treatment is frequently conducted. Commonly, boric acid and/or boron compounds are added to a treatment bath employed for the fixing treatment. Alternatively, if desired, iodine compounds may be incorporated in the treatment bath.

Drying of a prepared polarizer is preferably performed between 30-150° C., but is more preferably performed between 50-150° C.

An optically transparent protective film, exhibiting desired mechanical strength, is adhered to one or both sides or side of the polarizer, prepared as above, whereby a polarizing plate is prepared. Listed as adhesives for the above adhesion may be PVA based and urethane based adhesives. Of these, the PVA based adhesives are preferable.

(A Polarizing Plate and a Liquid Crystal Display)

A retardation film of the present invention has an excellent viewing angle compensation function and has improved a humidity dependence of a viewing angle compensation function and a viewing angle compensation function, whereby the retardation film can be used as a polarizer protection film, and also can be used as an optical compensation film to magnify the viewing angle of a liquid crystal display while maintaining a stable performance.

A polarizing plate of the present invention is explained.

The polarizing plate of the present invention is producible by a general method. For example, after carrying out an alkali saponification process for a cellulose ester film, there is a method of using a full saponification type polyvinyl-alcohol aqueous solution and sticking them on double surfaces of a polarizer. The alkali saponification process is a process to soak a cellulose ester film into a hot strong alkali liquid in order to improve the wetting of a water base adhesives and to raise adhesion property.

At this time, a retardation film of the present invention is used at least one of the cellulose ester film. Another cellulose ester film can be used for another surface. The cellulose ester film manufactured for a retardation film of the present invention may be used for the another surface, or a commercially available cellulose ester film (KC8UX 2M, KC4UX 2M, KC5UN, KC4UY, KC8UY (manufactured by Konica Minolta OPT Inc.)) may be used as a polarizing plate protection film of another surface of a surface side.

It is desirable that the polarizer protection film used for a surface side of a display device includes an antirelection layer, an antistatic coating and an antipollution layer besides anti-glaring layer or a clear hard coat layer.

The polarizing plate of the present invention obtained as mentioned above can be arranged so at to be pasted on double surfaces of liquid crystal cell, whereby a liquid crystal display of the present invention can be produced.

Moreover, at the time of production of a polarizing plate, it is desirable to carry out a lamination so that a in-plane slow axis of a retardation film of the present invention and a transmission axis of a polarizer are parallel or may intersect perpendicularly. In this case, it is especially preferable in the sense of manufacture that a long-roll film is used so as to paste roll to roll. With this, light leakage at the time of a black indication is improved remarkably and even if a liquid crystal display is has a big screen more than 15 type, preferably more than 19 type, there is no white omission in a screen periphery section. Further, even under an environment that humidity change is large, stable viewing angle characteristics with its effect are maintained for a long period of time. Especially, a prominent effect is observed on a MVA (multi domain vertical alignment) type liquid crystal display. Moreover, the viewing angle characteristics of a liquid crystal display which employs various drive systems, such as TN, VA, OCB, and HAN, can be optimized.

Embodiment

Below will be explained some preferred embodiments to illustrate the invention. However, it is to be understood that the invention is not intended to be limited to the specific embodiments.

Embodiment 1

First will be explained a method of measuring Ro, Rt, and S.

The inventors measured average refraction indexes of film components by an Abbe refractometer (4T) and film thicknesses by a commercially available micrometer.

The inventors kept film samples in a test environment of 23° C. and 55% RH for 24 hours, measured their retardations at a wavelength of 590 nm by an automatic double refractometer KOBRA-21ADH (manufactured by Oji Scientific Instruments), assigned the obtained average refraction index and film thickness values to the following equations, and calculated in-plane retardation (Ro), retardation (Rt) along the thickness of the film sample, and S values. At the same time, the inventors measured the directions of slow axes of the film samples.

$$Ro = (nx - ny) \times d \qquad \text{Equation (i)}$$

$$Rt = S \times d \qquad \text{Equation (ii)}$$

$$S = ((nx + ny)/2 - nz) \qquad \text{Equation (iii)}$$

(where "nx" is a maximum refraction index of the film surface, "ny" is a refraction index in the direction perpendicular to "nx," "nz" is a refraction index along the thickness of the film, and "d" is the thickness of the film (nm).)

<<Preparation of Cellulose Ester Film 101>>

| <Particle dispersion liquid> | |
|---|---|
| Particles (Aerosil R972V (manufactured by Japan Aerosil)) | 11 parts by mass |
| Ethanol | 89 parts by mass |

The inventors stirred the above mixture by a dissolver for 50 minutes and dispersed the particles in the mixture by a Manthon Gaulin.

<Particle-added Solution>

The inventors prepared a particle-added solution by taking the steps of adding a cellulose ester (shown below) into methylene chloride in a dissolution tank, heating the mixture until the cellulose ester is completely dissolved, filtering the solution by a filter paper Azumi #244 (manufactured by AZUMI FILTERPAPER CO., LTD), adding a particle dispersion liquid slowly into the filtrate (cellulose ester solution) while stirring the solution, dispersing the solution by an attriter, filtering the dispersion liquid by Finemet NF (manufactured by Nippon Seisen Co., Ltd.), and obtaining a particle-added solution.

| | |
|---|---|
| Methylene chloride | 99 parts by mass |
| Cellulose ester (Cellulose acetate propionate: Acetyl group replacement ratio of 1.5 and propionyl group replacement ratio of 0.7) | 4 parts by mass |
| Particle dispersion liquid | 11 parts by mass |

The inventors prepared a main dope solution of the composition shown below by taking the steps of putting methylene chloride and ethanol in a pressure dissolution tank, adding cellulose ester into the solvent mixture in the tank while stirring the mixture, heating the mixture until the cellulose ester is completely dissolved, adding a plasticizer and an ultraviolet absorbent into the solution, filtering the solution by a filter paper Azumi #244 (manufactured by AZUMI FILTERPAPER CO., LTD), and thus obtaining the main dope solution.

Then the inventors prepared cellulose ester film 101 of 1.5 m wide with a knurled part of 1 cm wide and 8 μm high on each end by taking the steps of putting 100 parts (by mass) of main dope solution and 2 parts of particle added solution in Toray static in-line mixer Hi-Mixer SWJ (manufactured by Toray Industries, Inc.), fully mixing the solution, uniformly flow-casting the solution over a 2 m-wide stainless band support by the belt flow casting device, letting the solvent evaporating from the stainless band support until the quantity of solvent left on the support is 110%, stretching the resulting web with a tensile force to make the longitudinal stretching ratio (MD) 1.0 when separating the web from the stainless band support, clamping both ends of the web by a tenter, stretching the web at 130° C. with 20 mass % of residual solvent at the start of stretching to make the stretching ratio 1.3 in the cross direction (TD), holding the current stretching status for a few seconds (keeping the width constant), releasing the cross tensile force, passing the drawn web through a third drying zone at 125° C. for 30 minutes to dry the web, and thus obtaining the above cellulose ester film.

| <Composition of the main doping solution> | |
|---|---|
| Methylene chloride | 300 parts by mass |
| Ethanol | 52 parts by mass |
| Cellulose ester (cellulose acetate propionate: Acetyl group replacement ratio of 1.5 and propionyl group replacement ratio of 0.7) | 100 parts by mass |
| Plasticizer A (pentaerythritol tetrabenzoate (polyvalent alcohol ester)) | 5 parts by mass |
| Plasticizer B (Sample No. 3 (aromatic end ester)) | 5 parts by mass |
| Ultraviolet absorbent (TINUVIN 109 (manufactured by Ciba Specialty Chemicals)) | 1.3 parts by mass |
| Ultraviolet absorbent (TINUVIN 171 (manufactured by Ciba Specialty Chemicals)) | 0.6 parts by mass |

<<Preparation of Cellulose Ester Films 102 to 122>>

The inventors prepared cellulose ester films 102 to 122 in the same conditions as cellulose ester film 101 but those listed in Table 1 (cellulose ester, plasticizer, film thickness, and stretching condition).

The inventors evaluated the prepared cellulose ester films 101 to 122 as shown below.

<<Evaluation>>

(Fluctuation of Retardation Values Due to Humidity Change)

The inventors measured retardation values of respective prepared cellulose ester films and calculated Rt(a) fluctuations from the values.

The inventors obtained the Rt(a) fluctuation by keeping film samples at 23° C. and 20% RH for 5 hours, measuring their refraction indexes Rt values (Rt(b)) in the same environment, keeping the same film samples at 23° C. and 80% RH for 5 hours, measuring their refraction indexes Rt values (Rt(c)) in the same environment, and assigning these values Rt(b) and Rt(c) to the Equations below.

$$Rt(a)=|Rt(b)-Rt(c)|$$

The inventors kept the humidity-controlled film samples again in a test measurement of 23° C. and 55% RH, measuring the retardation value of the film samples in the environment and confirmed that the fluctuation was a reversible fluctuation.

TABLE 1

| cellulose ester film No. | cellulose ester | | Plasticizer | | Retardation | | | stretching | | | Remarks |
|---|---|---|---|---|---|---|---|---|---|---|---|
| | Acetyl group | Propionyl group | Plasticizer A | Plasticizer B | *1 | Ro (nm) | Rt (nm) | S | MD | TD | *2 |
| 101 | 1.5 | 0.7 | a | Sample #3 | 30 | 50 | 150 | 0.0050 | ×1.0 | ×1.3 | 13 | *3 |
| 102 | 1.5 | 0.9 | a | Sample #3 | 30 | 43 | 130 | 0.0043 | ×1.0 | ×1.3 | 12 | *3 |

TABLE 1-continued

| cellulose ester film No. | cellulose ester Acetyl group | cellulose ester Propionyl group | Plasticizer Plasticizer A | Plasticizer Plasticizer B | *1 | Retardation Ro (nm) | Retardation Rt (nm) | S | stretching MD | stretching TD | *2 | Remarks |
|---|---|---|---|---|---|---|---|---|---|---|---|---|
| 103 | 1.6 | 0.9 | a | Sample #3 | 40 | 45 | 130 | 0.0033 | ×1.0 | ×1.3 | 15 | *3 |
| 104 | 1.7 | 0.9 | a | Sample #3 | 50 | 50 | 148 | 0.0030 | ×1.0 | ×1.3 | 17 | *3 |
| 105 | 2.6 | 0 | a | Sample #3 | 50 | 47 | 145 | 0.0029 | ×1.0 | ×1.3 | 18 | *3 |
| 106 | 2.0 | 0.7 | a | Sample #3 | 50 | 30 | 120 | 0.0024 | ×1.0 | ×1.3 | 18 | *3 |
| 107 | 2.0 | 0.7 | a | Sample #3 | 80 | 45 | 130 | 0.0016 | ×1.0 | ×1.3 | 25 | Comp. |
| 108 | 2.0 | 0 | a | Sample #3 | 60 | 80 | 320 | 0.0053 | ×1.0 | ×1.3 | 22 | Comp. |
| 109 | 1.5 | 0.9 | a | Sample #1 | 30 | 45 | 132 | 0.0044 | ×1.0 | ×1.3 | 13 | *3 |
| 110 | 1.6 | 0.9 | a | Sample #1 | 40 | 48 | 135 | 0.0034 | ×1.0 | ×1.3 | 16 | *3 |
| 111 | 1.7 | 0.9 | a | Sample #1 | 50 | 50 | 150 | 0.0030 | ×1.0 | ×1.3 | 18 | *3 |
| 112 | 1.8 | 0 | b | Sample #3 | 5 | Not | Not | Not | ×1.0 | ×1.3 | Not | Comp. |
| 113 | 1.0 | 0 | a | Sample #3 | 10 | 100 | 300 | 0.0300 | ×1.0 | ×1.5 | 15 | *3 |
| 114 | 1.2 | 0.8 | a | Sample #3 | 40 | 65 | 200 | 0.0050 | ×1.0 | ×1.3 | 17 | *3 |
| 115 | 2.0 | 0.8 | a | Sample #3 | 50 | 30 | 100 | 0.0020 | ×1.0 | ×1.3 | 18 | *3 |
| 116 | 2.0 | 0.5 | a | Sample #3 | 60 | 40 | 100 | 0.0017 | ×1.0 | ×1.3 | 22 | Comp. |
| 117 | 2.5 | 0.0 | a | Sample #3 | 20 | 20 | 65 | 0.0033 | ×1.0 | ×1.3 | 14 | Comp. |
| 118 | 0.8 | 0.0 | a | Sample #3 | 10 | 120 | 350 | 0.0350 | ×1.0 | ×1.5 | 18 | Comp. |
| 119 | 2.0 | 0.2 | a | Sample #3 | 40 | 80 | 180 | 0.0045 | ×1.0 | ×1.3 | 17 | *3 |
| 120 | 1.5 | 0.0 | a | Sample #3 | 10 | 50 | 150 | 0.0150 | ×1.0 | ×1.5 | 15 | *3 |
| 121 | 1.8 | 0.0 | a | Sample #3 | 60 | 130 | 400 | 0.0067 | ×1.0 | ×1.3 | 25 | Comp. |
| 122 | 2.9 | 0 | a | c | 80 | 1.5 | 60 | 0.0008 | ×1.0 | ×1.0 | 31 | Comp. | a: Pentaerythritol tetrabenzoate,
b: Triphenyl phosphate,
c: Ethylphthalyl ethyl glycolate,
Comp.: Comparative example,
*1: Film thickness (μm),
*2: Rt humidity change (20%-80%),
*3: Embodiment Judging from Table 1, apparently the cellulose ester film of this invention has excellent retardation film characteristics because the film has satisfactory retardations and the retardation value fluctuation due to humidity changes is smaller than that of comparative examples. With regard to cellulose ester film 112, the film surface condition was very bad, accordingly evaluation was not made.

Embodiment 2

The inventors prepared cellulose ester film 201 in the same conditions as cellulose ester film 102 of Embodiment 1 but Embodiment 2 uses the following heat treatment.

<Heat Treatment>

The inventors prepared cellulose ester film 201 by taking the steps of stretching a web by the tenter, drying the web by a hot dry air of 105° C. in the conveying and drying process equipped with upper and lower rolls until the quantity of residual solvent is 0.3 mass %, keeping the dried film at 110° C. in an environment (whose atmosphere change rate is 25 times an hour), sandwiching the web by multiple sets of nip rolls to give a pressure of 10 kPa to the web, cooling the web down to the room temperature, and taking up the web by a take-up roll.

The inventors prepared cellulose ester films 202 and 203 in the same test conditions but the heating temperature, atmosphere change rate, and pressurization are changed as shown in Table 2 and the free volume radius is controlled.

The atmosphere change rate in the above heating process means the number of atmosphere changes in a time unit by which the atmosphere V (m$^3$) of the heating chamber is substituted by fresh air at a flow rate of FA (m$^3$/hr), as expressed by the Equation below.

Atmosphere change rate=FA/V (times/hour)

<Measurement of a free volume radius by the Positron Annihilation Lifetime Measurement>

The inventors measured the radius of free volume of each cellulose ester film by the Positron Annihilation Lifetime Measurement.

<<Evaluation>>

The inventors evaluated retardation value fluctuations (due to humidity change of Embodiment 1) and the following items of the prepared cellulose ester films 201 to 203.

(Retardation Value Change Before and After the Hot and Humid Processing)

The inventors measured retardation values of the prepared cellulose ester films and calculated Rt(a') fluctuations from the values.

The inventors obtained the Rt(a') fluctuation by keeping film samples at 23° C. and 55% RH for 5 hours, measuring Rt value (Rt(b')) in the same environment, keeping the same film samples at 80° C. and 90% RH for 50 hours and then again at 23° C. and 55% RH for 5 hours, measuring Rt value (Rt(c')) in the same environment, and assigning these values Rt(b') and Rt(c') to the Equations below.

$$Rt(a')=|Rt(b')-Rt(c')|$$

The result of the above evaluation is listed in Table 2.

TABLE 2

| Cellulose ester film No. | Heating temperature (° C.) | Atmosphere change rate (time/hour) | Pressurization (kPa) | Free volume radius (nm) | Rt humidity change (20%-80%) | Rt hot humidity deterioration (50 h-0 h) | Remarks |
|---|---|---|---|---|---|---|---|
| 201 | 135 | 25 | 10 | 0.250 | 9 | 3 | Embodiment |
| 202 | 110 | 12 | — | 0.310 | 10 | 4 | Embodiment |
| 203 | 100 | 15 | — | 0.315 | 11 | 8 | Embodiment |
| 204 | 125 | 15 | 1 | 0.285 | 9 | 3 | Embodiment |
| 205 | 130 | 40 | 5 | 0.245 | 10 | 6 | Embodiment |

It is apparent that the cellulose ester film of this invention is excellent because its retardation value change due to humidity change is small and the free volume radius can be controlled in the preferable range (0.250 to 0.310 nm) by the above heating and pressing processing.

Embodiment 3

<<Preparation of Polarizing Plates>>

The inventors prepared an alkaline-saponificated polarizing plate from the above-prepared cellulose ester films as the raw material samples.

| <Alkaline saponification> | |
|---|---|
| Saponification process: 2M-NaOH | 50° C., 90 seconds |
| Rinse process: Water | 30° C., 45 seconds |
| Neutralization process: 10 mass % HCl | 30° C., 45 seconds |
| Rinse process: Water | 30° C., 45 seconds |

After the saponification, rinse, neutralisation, and rinse processes in that order, the films were dried at 80° C.

<Preparation of Polarizers>

(Polarizer A: polyvinyl alcohol)

The inventors prepared a 24 μm-thick polarizer by taking the steps of uniaxial-stretching a polyvinyl alcohol film of 120 μm thick (at a temperature of 110° C. and a stretching magnification of ×5), immersing the drawn film in an aqueous solution of 0.075 g of iodine, 5 g of potassium iodide, and 100 g of water for 60 seconds and then in an aqueous solution of 6 g of potassium iodide, 7.5 g of boric acid, and 100 g of water at 68° C., rinsing and drying thereof.

(Polarizer B: Ethylene Denatured Polyvinyl Alcohol)

The inventors prepared a 40 μm-thick ethylene denatured polyvinyl alcohol film by taking the steps of adding a mixture of 10 parts (by mass) of glycerine and 200 parts of water to 100 parts of ethylene denatured polyvinyl alcohol (Content of ethylene unit of 2.1 mol %, saponification degree of 99.92 mol %, and polymerization degree of 3000), fusion-blending the mixture, defoaming thereof, fusion-extruding thereof from a T die to metal rolls, and then drying thereof.

The prepared ethylene denatured polyvinyl alcohol film was then processed in series by pre-swelling, dyeing, uniaxial stretching, fixing, drying and heating. Finally, polarizers were obtained. Substantially, the inventors took the steps of immersing the ethylene denatured polyvinyl alcohol film in water of 30° C. for 60 seconds to let thereof pre-swell, immersing the pre-swollen film in an aqueous solution which contains 40 g/liter of boric acid, 0.4 g/liter of iodine, and 60 g/liter of potassium iodide at 35° C. for 2 minutes, uniaxial-stretching the swollen film up to 6 times in an aqueous solution which contains 4% of boric acid at 55° C., immersing the drawn film in an aqueous solution which contains 60 g/liter of potassium iodide, 40 g/liter of boric acid, and 10 g/liter of zinc chloride at 30° C. for 5 minutes to fix thereof, taking out the fixed ethylene denatured polyvinyl alcohol film from the solution, drying thereof by hot air of 40° C. while keeping the length constant, and heating thereof at 100° C. for 5 minutes.

The obtained polarizer has a thickness of 15 μm, a transmittance factor of 43%, and a polarization degree of 99.9%.

Then, the inventors prepared polarizing plates P102 to P104, P107 to P108, P114, P117 to P118, P122, P201 to P203 by bonding alkaline-saponificated cellulose ester film 122 to one surface of polarizer A and bonding each of cellulose ester films 102 to 104, 107 to 108, 114, 117 to 118, 122, 201 to 203 respectively to the other surface of polarizer A by an adhesive of aqueous solution of 5% of fully-saponificated polyvinyl alcohol, and drying thereof.

The inventors prepared polarizing plates P302 to P304, P307 to P308, P314, P317 to P318, P322, and P401 to P403 in the same method but polarizer A is substituted by polarizer B of ethylene denatured polyvinyl alcohol.

Further, the inventors prepared polarizing plates P502 to P504, P507 to P508, P514, P517 to P518 and P601 to P603 in the same method using polarizer A but cellulose ester films 102 to 104, 107 to 108, 114, 117 to 118, and 201 to 203 were kept for 50 hours in an environment of 80° C. and 90% RH.

Further, the inventors prepared polarizing plates P702 to P704, P707 to P708, P714, P717 to P718, and P801 to P803 in the same method using polarizer B but cellulose ester films 102 to 104, 107 to 108, 114, 117 to 118 and 201 to 203 were kept for 50 hours in an environment of 80° C. and 90% RH.

<<Preparation of Liquid Crystal Display Devices>>

The inventors prepared liquid crystal display devices 102 to 104, 107 to 108, 114, 117 to 118, 201 to 203, 302 to 304, 307 to 308, 314, 317 to 318, 401 to 403, 502 to 504, 507 to 508, 514, 517 to 518, 601 to 603, 702 to 704, 707 to 708, 714, 717 to 718 and 801 to 803 by removing double-sided polarizing plates from Fujitsu 15" display units VL-15OSD and attaching the prepared polarizing plates P102 to P104, P107 to P108, P114, P117 to P118, P122, P201 to P203, P302 to P304, P307 to P308, P314, P317 to P318, P322, P401 to P403, P502 to P504, P507 to P508, P514, P517 to P518, P601 to P603, P702 to P704, P707 to P708, P714, P717 to P718 and P801 to P803 respectively to the glass surfaces of the liquid crystal cells (VA type). In this case, the surface having a retardation film of this invention is placed in the liquid crystal cell side and the absorption axis of the polarizing plate is oriented to that of the old attached polarizing plate.

<Viewing Angle Fluctuation>

The inventors measured viewing angles of liquid crystal display devices 102 to 104, 107 to 108, 117 to 118, 201 to 203, 302 to 304, 307 to 308, 314, 317 to 318, and 401 to 403 which were prepared using ELDIM EZ-Contrast 160D in an environment of 23° C. and 55% RH, in an environment of 23° C. and 20% RH, and further in an environment of 23° C. and 80% RH, and evaluated according to the following judgmental standard. Finally, the inventors measured viewing angles of the liquid crystal display devices once more in the environment of 23° C. and 55% RH and confirmed that the fluctuations were reversible fluctuations. In the above tests, the liquid crystal display devices were kept for 5 hours in respective environments to adapt themselves to the environments before measurement.

Further, the inventors measured viewing angles of liquid crystal display devices 502 to 504, 507 to 508, 514, 517 to 518, 601 to 603, 702 to 704, 707 to 708, 714, 717, and 801 to 803 which were prepared using ELDIM EZ-Contrast 160D and compared the results of measurement by those of liquid crystal display devices 102 to 104, 107 to 108, 114, 117, 201 to 203, 302 to 304, 307 to 308, 314, 317 to 318 and 401 to 403.

A: No viewing angle fluctuation found
B: Little viewing angle fluctuation found
C: Some viewing angle fluctuations found
D: Great viewing angle fluctuation found The results of evaluation are listed in Table 3.

TABLE 3-1

| Liquid crystal display device No. | Front side polarizing plate | | | | Back side polarizing plate | | | Polarizer | | Field angle deterioration | Remarks |
|---|---|---|---|---|---|---|---|---|---|---|---|
| | *1 | cellulose ester film No. Viewing side | cellulose ester film No. Liquid crystal cell side | *2 | *1 | Liquid crystal cell side | Backlight side | Type | Film thickness (μm) | | |
| 102 | P102 | 122 | 102 | *2 | P102 | 102 | 122 | A | 24 | C | Embodiment |
| 103 | P103 | 122 | 103 | *2 | P103 | 103 | 122 | A | 24 | C | Embodiment |
| 104 | P104 | 122 | 104 | *2 | P104 | 104 | 122 | A | 24 | C | Embodiment |
| 107 | P107 | 122 | 107 | *2 | P107 | 107 | 122 | A | 24 | D | Comp. |
| 108 | P108 | 122 | 108 | *2 | P108 | 108 | 122 | A | 24 | D | Comp. |
| 114 | P122 | 122 | 122 | *2 | P114 | 114 | 122 | A | 24 | C | Embodiment |
| 117 | P117 | 122 | 117 | *2 | P117 | 117 | 122 | A | 24 | D | Comp. |
| 118 | P122 | 122 | 122 | *2 | P118 | 118 | 122 | A | 24 | D | Comp. |
| 201 | P201 | 122 | 201 | *2 | P201 | 201 | 122 | A | 24 | B | Embodiment |
| 202 | P202 | 122 | 202 | *2 | P202 | 202 | 122 | A | 24 | C | Embodiment |
| 203 | P203 | 122 | 203 | *2 | P203 | 203 | 122 | A | 24 | C | Embodiment |
| 302 | P302 | 122 | 102 | *2 | P302 | 102 | 122 | B | 15 | B | Embodiment |
| 303 | P303 | 122 | 103 | *2 | P303 | 103 | 122 | B | 15 | B | Embodiment |
| 304 | P304 | 122 | 104 | *2 | P304 | 104 | 122 | B | 15 | B | Embodiment |
| 307 | P307 | 122 | 107 | *2 | P307 | 107 | 122 | B | 15 | D | Comp. |
| 308 | P308 | 122 | 108 | *2 | P308 | 108 | 122 | B | 15 | D | Comp. |
| 314 | P322 | 122 | 122 | *2 | P314 | 114 | 122 | B | 15 | B | Embodiment |
| 317 | P317 | 122 | 117 | *2 | P317 | 117 | 122 | B | 15 | D | Comp. |
| 318 | P322 | 122 | 122 | *2 | P318 | 118 | 122 | B | 15 | D | Comp. |
| 401 | P401 | 122 | 201 | *2 | P401 | 201 | 122 | B | 15 | A | Embodiment |
| 402 | P402 | 122 | 202 | *2 | P402 | 202 | 122 | B | 15 | B | Embodiment |
| 403 | P403 | 122 | 203 | *2 | P403 | 203 | 122 | B | 15 | B | Embodiment |

*1: Polarizing plate No.,
*2: Liquid crystal cell
**: Treated for 50 hours under the environment of 80° C. and 90% RH

TABLE 3-2

| Liquid crystal display device No. | Front side polarizing plate | | | | Back side polarizing plate | | | Polarizer | | Field angle deterioration | Remarks |
|---|---|---|---|---|---|---|---|---|---|---|---|
| | *1 | cellulose ester film No. Viewing side | cellulose ester film No. Liquid crystal cell side | *2 | *1 | Liquid crystal cell side | Backlight side | Type | Film thickness (μm) | | |
| 502 | P502 | 122 | **102 | *2 | P502 | **102 | 122 | A | 24 | B | Embodiment |
| 503 | P503 | 122 | **103 | *2 | P503 | **103 | 122 | A | 24 | B | Embodiment |
| 504 | P504 | 122 | **104 | *2 | P504 | **104 | 122 | A | 24 | B | Embodiment |
| 507 | P507 | 122 | **107 | *2 | P507 | **107 | 122 | A | 24 | D | Comp. |
| 508 | P508 | 122 | **108 | *2 | P508 | **108 | 122 | A | 24 | D | Comp. |
| 514 | P122 | 122 | 122 | *2 | P514 | **114 | 122 | A | 24 | B | Embodiment |
| 517 | P517 | 122 | **117 | *2 | P517 | **117 | 122 | A | 24 | D | Comp. |
| 518 | P122 | 122 | 122 | *2 | P518 | **118 | 122 | A | 24 | D | Comp. |
| 601 | P601 | 122 | **201 | *2 | P601 | **201 | 122 | A | 24 | B | Embodiment |
| 602 | P602 | 122 | **202 | *2 | P602 | **202 | 122 | A | 24 | B | Embodiment |
| 603 | P603 | 122 | **203 | *2 | P603 | **203 | 122 | A | 24 | B | Embodiment |

TABLE 3-2-continued

| Liquid crystal display device No. | Front side polarizing plate | | | | Back side polarizing plate | | | | | | |
| --- | --- | --- | --- | --- | --- | --- | --- | --- | --- | --- | --- |
| | | cellulose ester film No. | | | | cellulose ester film No. | | Polarizer | | Field angle deterio- ration | Remarks |
| | *1 | Viewing side | Liquid crystal cell side | *2 | *1 | Liquid crystal cell side | Backlight side | Type | Film thickness (μm) | | |
| 702 | P702 | 122 | **102 | *2 | P702 | **102 | 122 | B | 15 | A | Embodiment |
| 703 | P703 | 122 | **103 | *2 | P703 | **103 | 122 | B | 15 | A | Embodiment |
| 704 | P704 | 122 | **104 | *2 | P704 | **104 | 122 | B | 15 | A | Embodiment |
| 707 | P707 | 122 | **107 | *2 | P707 | **107 | 122 | B | 15 | D | Comp. |
| 708 | P708 | 122 | **108 | *2 | P708 | **108 | 122 | B | 15 | D | Comp. |
| 714 | P322 | 122 | 122 | *2 | P714 | **114 | 122 | B | 15 | A | Embodiment |
| 717 | P717 | 122 | **117 | *2 | P717 | **117 | 122 | B | 15 | D | Comp. |
| 718 | P322 | 122 | 122 | *2 | P717 | **118 | 122 | B | 15 | D | Comp. |
| 801 | P801 | 122 | **201 | *2 | P801 | **201 | 122 | B | 15 | A | Embodiment |
| 802 | P802 | 122 | **202 | *2 | P802 | **202 | 122 | B | 15 | A | Embodiment |
| 803 | P803 | 122 | **203 | *2 | P803 | **203 | 122 | B | 15 | A | Embodiment |

*1: Polarizing plate No.,
*2: Liquid crystal cell
**: Treated for 50 hours under the environment of 80° C. and 90% RH It is apparent that the liquid crystal display devices of this invention have no viewing angle fluctuation even in an environment in which humidity changes and their display performances are extremely stable even after the cellulose ester films were kept in an environment of 80° C. and 90% RH for 50 hours. Particularly, liquid crystal display device using ethylene denatured polyvinyl alcohol polarizers are more stable in the display performamance.

With regard to the liquid crystal display devices 117, 118, 317, 318, 517, 518, 717, 718 employing cellulose ester film 117, 118, although the fluctuation of the retardation value was small, since the retardation value was not fit with the liquuid crystal display devices, the fluctuation of the viewing angle was large.

What is claimed is:

1. A retardation film, containing:
a cellulose derivative; and a plasticizer in an amount of 1 to 20% by mass to the cellulose derivative; wherein the thickness of the film is 10 to 50 micrometer, wherein the radius of a free volume of the film, obtained by Positron Annihilation Lifetime Spectroscopy, is 0.250 to 0.310 nm, Ro in Equation (i) is in the range of 30 to 100 nm, Rt in Equation (ii) is in the range of 100 to 300 nm, and S in Equation (iii) is 0.002 or more but not exceeding 0.030, $Ro=(nx-ny)\times d$      Equation (i)

$Rt=S\times d$      Equation (ii)

$S=((nx+ny)/2-nz)$      Equation (iii)

where "nx" is a maximum refraction index of the film surface, "ny" is a refraction index in the direction perpendicular to "nx," "nz" is a refraction index along the thickness of the film, and "d" is the thickness of the film, wherein the plasticizer contains a polyvalent alcohol ester type plasticizer and an aromatic terminal ester type plasticizer, and the aromatic terminal ester type plasticizer is represented by the following general formula:

B-(G-A)n-G-B where B represents a benzenemonocarboxylic acid residue, G represents an alkylene glycol residue having 2-12 carbon atoms, an aryl glycol residue having 6-12 carbon atoms, or an oxyalkylene glycol residue having 4-12 carbon atoms, A represents an alkylene dicarboxylic acid residue having 4-12 carbon atoms, or an aryl dicarboxylic acid residue having 6-12 carbon atoms, and n represents an integer of 1 or more.

2. The retardation film of claim 1, wherein Ro is in the range of 30 to 65 nm, Rt is in the range of 100 to 150 nm, and S is 0.002 or more but not exceeding 0.015.

3. The retardation film of claim 1, wherein the total acyl group substitution degree of the cellulose derivative is 2.0 to 2.6.

4. A polarizing plate, comprising:
a polarizer; and
the retardation film of claim 1, pasted on at least one surface of the polarizer.

5. The polarizing plate of claim 4, wherein the polarizer contains an ethylene modified polyvinyl alcohol whose content of ethylene units is 1 to 4 mol %, degree of polymerization is 2000 to 4000, and degree of saponification is 99.0 to 99.99 mol % and the thickness of the polarizer is 5 to 20 μm.

6. A liquid crystal display device, comprising: a liquid crystal cell, and the polarizing plate of claim 4.

* * * * *